(12) United States Patent
Achong et al.

(10) Patent No.: US 7,825,965 B2
(45) Date of Patent: Nov. 2, 2010

(54) METHOD AND APPARATUS FOR INTERPOLATING MISSING COLORS IN A COLOR FILTER ARRAY

(75) Inventors: Jeffrey Matthew Achong, Brampton (CA); Hui Zhou, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 361 days.

(21) Appl. No.: 11/852,144

(22) Filed: Sep. 7, 2007

(65) Prior Publication Data
US 2009/0066821 A1  Mar. 12, 2009

(51) Int. Cl.
*H04N 9/64* (2006.01)
(52) U.S. Cl. ...................................... 348/246
(58) Field of Classification Search ............... 348/222.1, 348/273, 272, 241, 246, 247, 251, 223.1, 348/234, 238, 252; 382/167, 162
See application file for complete search history.

(56) References Cited

U.S. PATENT DOCUMENTS

| | | | |
|---|---|---|---|
| 5,382,976 A | 1/1995 | Hibbard | |
| 5,627,734 A | 5/1997 | Karlecik-Maier | |
| 6,236,430 B1 | 5/2001 | Suzuki et al. | |
| 6,348,903 B1 * | 2/2002 | Wu et al. ...................... | 345/10 |
| 6,388,706 B1 * | 5/2002 | Takizawa et al. ............ | 348/273 |
| 6,421,084 B1 | 7/2002 | Chang et al. | |
| 6,496,608 B1 | 12/2002 | Chui | |
| 6,570,616 B1 | 5/2003 | Chen | |
| 6,714,232 B2 | 3/2004 | Kerr et al. | |
| 6,744,916 B1 | 6/2004 | Takahashi | |
| 6,747,698 B2 | 6/2004 | Abe | |
| 6,816,197 B2 | 11/2004 | Keshet et al. | |
| 6,833,868 B1 | 12/2004 | Meynants et al. | |
| 6,836,289 B2 | 12/2004 | Koshiba et al. | |
| 6,897,425 B2 | 5/2005 | Osada | |
| 6,900,833 B2 | 5/2005 | Abe | |
| 6,900,836 B2 | 5/2005 | Hamilton, Jr. | |
| 6,985,180 B2 * | 1/2006 | Chang et al. ................ | 348/246 |
| 7,199,824 B2 * | 4/2007 | Chang et al. ................ | 348/246 |
| 7,236,191 B2 * | 6/2007 | Kalevo et al. ............ | 348/222.1 |
| 7,525,584 B2 * | 4/2009 | Muresan ..................... | 348/280 |
| 2002/0063789 A1 | 5/2002 | Acharya et al. | |
| 2002/0126209 A1 * | 9/2002 | Yamada et al. ............. | 348/219 |
| 2002/0167602 A1 | 11/2002 | Nguyen | |
| 2002/0196354 A1 * | 12/2002 | Chang et al. ................ | 348/246 |
| 2003/0016295 A1 | 1/2003 | Nakakuki | |
| 2003/0052981 A1 | 3/2003 | Kakarala et al. | |
| 2003/0117507 A1 | 6/2003 | Kehtarnavaz et al. | |
| 2003/0231251 A1 | 12/2003 | Tsukioka | |
| 2003/0234879 A1 | 12/2003 | Whitman et al. | |
| 2004/0051798 A1 | 3/2004 | Kakarala et al. | |
| 2004/0095475 A1 | 5/2004 | Yamamoto et al. | |
| 2004/0141072 A1 | 7/2004 | Nilsson et al. | |

(Continued)

*Primary Examiner*—Jason Chan
*Assistant Examiner*—Nicholas G Giles
(74) *Attorney, Agent, or Firm*—Mark P. Watson

(57) ABSTRACT

A method, of interpolating missing colors in a color filter array comprising red, green and blue photosites comprises determining and interpolation direction for each red and each blue photosite based on local edge information and interpolating a green color for each red and each blue photosite in the determined interpolation direction for that photosite. For each green photosite, red and blue colors are interpolated. For each red photosite, a blue color is interpolated in the determined interpolation direction for that photosite and for each blue photosite, a red color is interpolated in the determined interpolation direction for that photosite.

15 Claims, 41 Drawing Sheets

U.S. PATENT DOCUMENTS

| | | |
|---|---|---|
| 2004/0160521 A1 | 8/2004 | Yamamoto |
| 2004/0161145 A1 | 8/2004 | Embler |
| 2004/0169747 A1 | 9/2004 | Ono et al. |
| 2004/0179752 A1 | 9/2004 | Cheng et al. |
| 2005/0007470 A1 | 1/2005 | Kimura et al. |
| 2005/0030409 A1 | 2/2005 | Matherson et al. |
| 2005/0058361 A1 | 3/2005 | Tajima |
| 2005/0146629 A1 * | 7/2005 | Muresan .................... 348/280 |
| 2005/0169521 A1 | 8/2005 | Hel-Or |
| 2005/0174441 A1 | 8/2005 | Acharya et al. |
| 2005/0201616 A1 | 9/2005 | Malvar et al. |
| 2005/0276475 A1 | 12/2005 | Sawada |
| 2006/0012695 A1 * | 1/2006 | Chang et al. ................ 348/246 |
| 2006/0012841 A1 | 1/2006 | Tsukioka |
| 2006/0022997 A1 | 2/2006 | Spampinato et al. |
| 2006/0023089 A1 | 2/2006 | Kobayashi |
| 2009/0147109 A1 * | 6/2009 | Muresan .................... 348/253 |

* cited by examiner

GRADIENT ANALYSIS (AT Sensed RED): VERTICAL UP

R28_UV = (|G11 − G27| + |G4 − G20| + |G13 − G29| + |R12 − R28|)/4

GRADIENT ANALYSIS (AT Sensed RED): VERTICAL DOWN

R28_LV = (|G27 - G43| + |G36 - G52| + |G29 - G45| + |R28 - R44|)/4

GRADIENT ANALYSIS (AT Sensed RED): HORIZONTAL RIGHT

R28_RH = (|G20 - G22| + |G29 - G31| + |G36 - G38| + |R28 - R30|)/4

GRADIENT ANALYSIS (AT Sensed RED): HORIZONTAL LEFT

R28_LH = (|G18 − G20| + |G25 − G27| + |G34 − G36| + |R26 − R28|)/4

GRADIENT ANALYSIS (AT Sensed RED): FORWARD DIAGONAL

GREEN

RED

BLUE $R28\_FD = (|G13 - G20| + |G20 - G27| + |G27 - G34|$
$+ |G22 - G29| + |G29 - G36| + |G36 - G43|$
$+ |B21 - B35|)/7$

GRADIENT ANALYSIS (AT Sensed RED): BACKWARD DIAGONAL

R28_BD = (|G11 - G20| + |G20 - G29| + |G29 - G38|
+ |G18 - G27| + |G27 - G36| + |G36 - G45|
+ |B19 - B37|)/7

GREEN CHANNEL INTERPOLATION (AT Sensed RED): DIAGONAL

GRADIENT ANALYSIS (AT Sensed BLUE): VERTICAL UP

B37_UV = (|G20 - G36| + |G13 - G29| + |G22 - G38| + |B21 - B37|)/4

GRADIENT ANALYSIS (AT Sensed BLUE): VERTICAL DOWN

$B37\_LV = (|G36 - G52| + |G45 - G61| + |G38 - G54| + |B37 - B53|)/4$

GRADIENT ANALYSIS (AT Sensed BLUE): HORIZONTAL RIGHT

B37_RH = (|G29 − G31| + |G38 − G40| + |G45 − G47| + |B37 − B39|)/4

GRADIENT ANALYSIS (AT Sensed BLUE): HORIZONTAL LEFT

B37_LH = (|G27 - G29| + |G34 - G36| + |G43 - G45| + |B35 - B37|)/4

GRADIENT ANALYSIS (AT Sensed BLUE): FORWARD DIAGONAL

B37_FD = (|G22 - G29| + |G29 - G36| + |G36 - G43|
+ |G31 - G38| + |G38 - G45| + |G45 - G52|
+ |R30 - R44|)/7

GRADIENT ANALYSIS (AT Sensed BLUE): BACKWARD DIAGONAL

B37_BD = (|G20 − G29| + |G29 − G38| + |G38 − G47|
+ |G27 − G36| + |G36 − G45| + |G45 − G54|
+ |R28 − R46|)/7

GREEN CHANNEL INTERPOLATION (AT Sensed BLUE): VERTICAL

GREEN CHANNEL INTERPOLATION (AT Sensed BLUE): HORIZONTAL

GREEN CHANNEL INTERPOLATION (AT Sensed BLUE): DIAGONAL

FIG. 7C

RED CHANNEL INTERPOLATION (AT Sensed GREEN)

BLUE CHANNEL INTERPOLATION (AT Sensed GREEN)

$k28 = G28 - R28 \qquad k30 = G30 - R30$ $B29 = G29 - (k28 + k30)/2$

FIG. 11

BLUE CHANNEL INTERPOLATION (AT Sensed RED)

FIG. 13

RED CHANNEL INTERPOLATION (AT Sensed Blue)

*FIG. 15*

FULL RED, BLUE AND GREEN CHANNELS

| R1 G1 B1 | B2 R2 G2 | R3 G3 B3 | B4 R4 G4 | R5 G5 B5 | B6 R6 G6 | R7 G7 B7 | B8 R8 G8 |
|---|---|---|---|---|---|---|---|
| B9 R9 G9 | B10 G10 R10 | B11 R11 G11 | B12 G12 R12 | B13 R13 G13 | B14 G14 R14 | B15 R15 G15 | B16 G16 R16 |
| R17 G17 B17 | B18 R18 G18 | R19 G19 B19 | B20 R20 G20 | R21 G21 B21 | B22 R22 G22 | R23 G23 B23 | B24 R24 G24 |
| B25 R25 G25 | B26 G26 R26 | B27 R27 G27 | B28 G28 R28 | B29 R29 G29 | B30 G30 R30 | B31 R31 G31 | B32 G32 R32 |
| R33 G33 B33 | B34 R34 G34 | R35 G35 B35 | B36 R36 G36 | R37 G37 B37 | B38 R38 G38 | R39 G39 B39 | B40 R40 G40 |
| B41 R41 G41 | B42 G42 R42 | B43 R43 G43 | B44 G44 R44 | B45 R45 G45 | B46 G46 R46 | B47 R47 G47 | B48 G48 R48 |
| R49 G49 B49 | B50 R50 G50 | R51 G51 B51 | B52 R52 G52 | R53 G53 B53 | B54 R54 G54 | R55 G55 B55 | B56 R56 G56 |
| B57 R57 G57 | B58 G58 R58 | B59 R59 G59 | B60 G60 R60 | B61 R61 G61 | B62 G62 R62 | B63 R63 G63 | B64 G64 R64 |

GREEN

RED

BLUE

METHOD AND APPARATUS FOR INTERPOLATING MISSING COLORS IN A COLOR FILTER ARRAY

FIELD OF THE INVENTION

The present invention relates generally to image processing and more particularly, to a method and apparatus for interpolating missing colors in a color filter array.

BACKGROUND OF THE INVENTION

Digital cameras and other image capture devices employ image sensors, such as charge coupled devices (CCDs), complementary metal oxide semiconductor (CMOS) devices or Foveon sensors, to capture images for subsequent storage and display. A typical CCD or CMOS color image sensor in an image capture device comprises a grid or array of photosensitive locations commonly referred to as photosites. During image capture of a scene, each photosite is capable of sensing only a single green, red or blue color. The resulting digital image data forms a pattern (or "mosaic") of red, green and blue colors known as a color filter array (CFA). In order to reproduce the scene on a visual display in proper color, each pixel in the visual display requires full color information. As will be appreciated, the CFA is therefore missing information required to reproduce the scene in proper color.

To produce a full color image from a CFA, green, red and blue colors must be interpolated at photosites at which they are missing (i.e., have not been sensed), using sensed colors at local photosites. The process of interpolating missing colors in a CFA is known as de-mosaicing.

The Bayer pattern, a well-known CFA, is a two-by-two array of colors half of which are green, a quarter of which are red, and a quarter of which are blue. Rows of the Bayer CFA have alternating green and red photosites, or alternating green and blue photosites, whereby the green photosites in the Bayer CFA are distributed in a quincunx pattern. Methods for de-mosaicing the Bayer CFA and other CFAs are very well documented. For example, U.S. Pat. No. 6,421,084 to Chang et al. discloses a method for recovering the missing colors in a captured Bayer color filter array. During the method, a set of gradient values is determined for each data element at a specific location in the color filter array. The gradient values correspond to color value differences in a plurality of directions from the data element. From the set of gradient values, a threshold value is determined. Using the threshold value, a subset of the gradient values is selected so that the members of the subset have gradient values less than the threshold value. Additional color values for each data element are interpolated on the basis of the subset of gradient values, rather than in only a single direction.

U.S. Pat. No. 6,236,430 to Suzuki et al. discloses an image capture device capable of moving a Bayer filter in several directions relative to a charge coupled device (CCD) in order to capture multiple sets of image data for each image. The multiple sets of data comprising red, green and blue information for each sensor position in the color filter array are synthesized in order to output a full color image without interpolation.

U.S. Pat. No. 6,496,608 to Chui discloses an image data interpolation system and method that employs finite impulse response filters. Based on a subset of captured Bayer pattern CFA values and a pixel filling filter equation, smoothness, low distortion and continuous surfaces are ensured.

U.S. Pat. No. 6,836,289 to Koshiba et al. discloses a method for interpolating a Bayer color filter array. First the green channel is interpolated to yield a green plane. After the green plane has been obtained, the edges in the green plane are detected and used to compute a high-pass component of the green channel. Red and blue interpolation is performed and the results are corrected using the weighted high-pass component of the green channel.

U.S. Pat. No. 6,900,836 to Hamilton, Jr. discloses a method for correcting corruption in a column of pixels in an image sensor. Classifiers are computed using non-corrupt pixel data adjacent to corrupt pixel data in order to determine whether either horizontal or diagonal edges run through the column. Interpolation is conducted first for green and then for red/blue corrupted pixels in the column according to the edge direction indicated by the classifiers.

U.S. Patent Application Publication Nos. 2002/0063789 and 2005/0174441 to Acharya et al. disclose a color filter array that simplifies the process of interpolating unsensed color values. The CFA comprises more than half green sensors, thereby enabling an interpolation scheme to more accurately result in a full green channel. Edge zones, smooth zones and stripe zones are computed by determining the variance in values in 3×3 arrays of pixel values. Interpolation is conducted based on the type of zone computed in each array.

U.S. Patent Application Publication No. 2002/0167602 to Nguyen discloses a method for de-mosaicing image data captured according to the Bayer CFA that purports to reduce interpolation artifacts along feature edges. Color discontinuities are equalized on the assumption that the changes in local color intensity values relative to a local average are the same for each of the color components.

U.S. Patent Application Publication No. 2003/0052981 to Kakarala et al. discloses a method for interpolating missing color values in raw data captured as a color filter array. The method employs a voting scheme for determining an interpolation direction or combination of directions for each of the missing pixel locations. The interpolation is conducted using color differencing for first the luminance color plane, and then the chrominance color planes based on the interpolated and sensed luminance data. The luminance and chrominance color planes are then summed to yield an output image.

U.S. Patent Application Publication No. 2003/0117507 to Kehtarnavaz et al. discloses a color filter array interpolation scheme that uses directional derivatives to determine interpolation directions for each missing pixel. The pixel values surrounding a missing pixel are weighted inversely during interpolation with the directional derivatives in vertical, horizontal and diagonal directions in order to yield an interpolated value. First, luminance interpolation is conducted. Next, chrominance interpolation is conducted based on the luminance interpolation. Chrominance interpolation is conducted by interpolating red at sensed blue and blue at sensed red using the weights previously determined, and then red at sensed green and blue at sensed green using direction predictors.

U.S. Patent Application Publication No. 2004/0051798 to Kakarala et al. discloses a method for correcting corrupt pixels in a digital color image sensor. For a current pixel, gradients of neighboring pixels in at least one other color plane than the color plane of the current pixel are used to determine whether the current pixel is defective. Both the gradients and a range of sensor values from neighboring pixels in the same color plane as the current pixel can be determined. If the sensor value of the current pixel is outside of the range by a threshold amount that is calculated using one or more of the gradients, the current pixel is determined to be a defective pixel. The gradients in other color planes are said to provide a more accurate prediction of the sensor value of the current pixel by considering the local roughness in the image.

U.S. Patent Application Publication No. 2004/0141072 to Nilsson et al. discloses a method of interpolating colors in raw data captured using a Bayer CFA. Gradient information is collected for the four compass directions from both the luminance channel and chrominance channel that is to be interpolated, and an inverse gradient function is applied in order to provide greater weight to interpolation along edges. Interpolation is performed using color differencing.

U.S. Patent Application Publication No. 2004/0161145 to Embler discloses a method for interpolating color values captured using a Bayer CFA based on color samples of nearby locations. The interpolated values are selectively adjusted based on correlations between pre-identified reference patterns of values and the patterns of values within neighborhoods of the pixels. The reference patterns may be combinations of a high reference value and a low reference value such as maximum and minimum color values of the digitized video signal. The set of reference patterns represents various luminance gradients within the range.

U.S. Patent Application Publication No. 2004/0169747 to Ono et al. discloses a method for directionally interpolating color channel values in a Bayer CFA. Weights are computed based on averages of pixel values adjacent a location of interest, and are used to directionally interpolate the pixel value at the location of interest.

U.S. Patent Application Publication No. 2004/0179752 to Cheng et al. discloses a system and method for interpolating a color image from an array of single color sensors. For each data element in the array, four gradients are computed that specify the color and/or luminance difference along different linear paths passing through the data element. The gradients are calculated using a first-order color differential and a second order (Laplacian) color or luminance differential along the respective linear path. Interpolation is also conducted using first and second order color differentials in a five-by-five array of pixels surrounding the current pixel.

U.S. Patent Application Publication No. 2005/0058361 to Tajima discloses an interpolation method for a Bayer pattern CFA. Unsensed colors are interpolated based on a weighted average of the outputs of vertical and horizontal interpolation units. The weights are determined by computation of high frequency components in the image and are varied in order to effectively vary the direction of interpolation as required from vertical to horizontal and various degrees of slope in-between.

U.S. Patent Application Publication No. 2005/0146629 to Muresan discloses an edge directed de-mosaicing method for a CFA that sequentially employs a coarse model fit for determining edge direction, a color-difference interpolation scheme in the edge direction, and then a fine model fit, which uses the interpolated values to re-estimate the local edge direction.

U.S. Patent Application Publication No. 2005/0169521 to Hel-Or discloses a method for reducing aliasing and zippered edges caused during the process of de-mosaicing raw data captured using a Bayer CFA. A bilinear or bicubic interpolation is used to estimate missing information in each of the green, red and blue color planes, and the full color image is transformed to luminance-chrominance-chrominance color space. Smoothing is performed on the transformed image, and then the image is transformed back to the red-green-blue (RGB) color space.

U.S. Pat. No. 5,382,976 to Hibbard discloses a method for adaptively interpolating a full color image that uses luminance gradients to determine an interpolation direction. Gradient values for the luminance channel are determined in at least two directions and compared to a threshold. One of the directions is chosen based on the gradients and the threshold, as the direction in which first unsensed greens are interpolated. Red and blue values are then interpolated without consideration of direction, using color differencing.

U.S. Pat. No. 5,627,734 to Hamilton Jr. et al. discloses a sequential adaptive directional interpolation scheme for colors in a Bayer CFA. A first interpolation direction is selected using a classifier computed by adding LaPlacian second-order values of the green plane to gradient values between known chrominance pixel locations surrounding an unknown green pixel. Then, the selected interpolation direction is used to perform the green interpolation and a correction factor is added based on either neighboring red or blue pixels. After green interpolation, chrominance interpolation that employs the selected interpolation direction is used to interpolate chrominance values and a correction factor is then added to the interpolated chrominance value.

U.S. Pat. No. 6,570,616 to Chen discloses a method for de-mosaicing image data captured using a Bayer pattern CFA that detects edges in the data by, for green interpolation, comparing a primary reference pixel adjacent to a target location of interest with secondary reference pixels surrounding the primary reference pixel. Where the primary reference pixel has a greater luminance than all surrounding pixels, an edge is detected. For example, an edge in the vertical direction is detected for the target location when a value associated with the primary reference pixel located at the top side of the target location is larger than the corresponding values associated with the four secondary reference pixels existing in the vicinity of the primary reference pixel and when a value associated with the primary reference pixel at the bottom side of the target location is larger than the corresponding values associated with the four secondary reference pixels existing in the vicinity of the primary reference pixel. When relative evaluation of primary and secondary reference pixels is reversed, an edge is also considered to have been detected. Green interpolation is performed in accordance with the determined edge direction using only green pixels, and red and blue channels are then interpolated without explicitly employing edge information, using color differencing.

U.S. Pat. No. 6,714,232 to Kobayashi discloses a method for interpolating missing color data captured using a Bayer arrangement of red, green and blue colors. A correlation measurement is obtained in eight directions relative to a target pixel by determining differences between pixels in each direction. The correlation measurements are used as coefficients for weighting the contribution of each direction to the interpolation. Interpolation is then performed in one of the vertical, horizontal and diagonal directions.

U.S. Pat. No. 6,744,916 to Takahashi discloses an image processing apparatus and method for interpolating missing pixels in a color filter array. The horizontal and vertical gradients for each of four adjacent pixels around a missing pixel are calculated. Based on the gradients, the minimum for each horizontal and vertical set is determined and used in combination with horizontal and vertical thresholds to yield the missing pixel value. Diagonal interpolation is conducted using combinations of the vertical and horizontal values. The combinations are based on the horizontal and vertical gradients for the missing pixel.

U.S. Pat. No. 6,833,868 to Meynants et al. discloses an interpolation method for color filter arrays that compares values of chrominance in the vicinity of a missing pixel and using a vote-operator, employs the dominant median or average chrominance value to be used for interpolation. Interpolation is conducted by averaging neighboring pixels.

U.S. Pat. No. 6,897,425 to Osada discloses an interpolation method for color filter arrays which employs a simple absolute difference of horizontal and vertical intensities to determine whether there is any correlation therebetween. Correlation is established if a threshold is exceeded. Interpolation is performed after conversion to the YCbCr color space based on the correlation measurements.

U.S. Pat. Nos. 6,900,833 and 6,747,698 to Abe disclose an image interpolating device that uses the absolute difference of horizontal and vertical intensities to determine an interpolation direction for missing pixels in a color filter array. The green channel in the CFA is interpolated according to the determined direction information, and the red/blue interpolation at sensed blue/red locations is then conducted without explicit use of direction information. Chromatic blur is reduced by conducting red/blue interpolation at sensed green locations after conversion to the YCbCr colorspace.

U.S. Patent Application Publication No. 2004/0095475 to Yamamoto et al. discloses a method for interpolating missing pixel values in a color filter array that calculates both horizontal and vertical estimates for missing RGB values. A correlation template is then employed to compute normalized weights to vary the contribution of each of the estimates to the interpolated value. Horizontal and vertical green values are calculated using a first weight template to interpolate green on unknown green and to refine green on known green. Vertical and horizontal red and blue values are calculated using a color difference method.

U.S. Patent Application Publication No. 2004/0160521 to Yamamoto discloses an image processing device that interpolates missing values in a color filter array. The device calculates directional strength using gradients and allots weights obtained by experiment in the form of coefficients for the interpolation in multiple directions. In accordance with whether the determined directional strength lies in the negative or positive range, directional interpolation of green pixels is applied using neighborhood sensed green and red/blue pixels. This method is similar to that disclosed in above-mentioned U.S. Pat. No. 5,629,734.

U.S. Patent Application Publication No. 2005/0007470 to Kimura et al. discloses an interpolation method for color filter arrays that employs a template-based gradient calculation method. High frequency edge directions are determined using the templates, and interpolation is performed in accordance with the edge detection using proximate same-channel values.

While methods of interpolating missing color values in CFAs are well documented, the prior art references discussed above disclose techniques that tend to suffer from degradation in image quality. Degradation is caused by inaccuracies due to the selection of a sub-optimal interpolation direction or the introduction of artifacts during interpolation. Furthermore, many of the prior art techniques discussed above require complex and costly processing for second or higher order computation. Improvements are therefore desired.

It is therefore an object to provide a novel method and apparatus for interpolating missing colors in a color filter array.

SUMMARY OF THE INVENTION

Accordingly, in one aspect there is provided a method of interpolating missing colors in a color filter array (CFA) comprising red, green and blue photosites, the method comprising:

determining an interpolation direction for each red and each blue photosite based on local edge information;

interpolating a green color for each red and each blue photosite in the determined interpolation direction for that photosite;

for each green photosite, interpolating red and blue colors;

for each red photosite, interpolating a blue color in the determined interpolation direction for that photosite; and for each blue photosite, interpolating a red color in the determined interpolation direction for that photosite.

In one embodiment, the interpolation direction for each red and each blue photosite corresponds to the direction along which a local edge, proximate to that photosite, most likely runs. The interpolation direction determining comprises for each red and blue photosite, examining different groups of photosites adjacent the photosite to detect local edges with each group of photosites being associated with a different direction, determining the group of photosites associated with the direction that corresponds with the direction of the local edge, and assigning the photosite an interpolation direction corresponding to the direction associated with the determined group of photosites.

During the photosite group examining, directional gradients for each group of photosites are calculated. During the photosite group determining, the directional gradients are compared to detect the smallest gradient. Each group of photosites comprises photosites along a central strand intersecting the photosite and photosites along strands flanking the central strand. The directional gradients comprise upper and lower vertical, left and right horizontal and forward and backward diagonal gradients. The directional gradient calculating comprises, for each gradient, calculating differences between different pairs of photosites in each group.

According to another aspect there is provided an apparatus for interpolating missing colors in a color filter array comprising, red, green and blue photosites, comprising an edge detector for determining a local edge for each red and each blue photosite;

a first interpolator interpolating a green color for each red and each blue photosite in an interpolation direction corresponding to the direction of the determined local edge for that photosite;

a second interpolator interpolating, for each green photosite, red and blue colors;

a third interpolator interpolating, for each red photosite, a blue color in the determined interpolation direction for that photosite; and a fourth interpolator interpolating, for each blue photosite, a red color in the determined interpolation direction for that photosite.

According to yet another aspect there is provided an apparatus for interpolating missing colors in a color filter array comprising red, green and blue photosites, comprising:

means for determining an interpolation direction for each red and each blue photosite based on local edge information;

means for interpolating a green color for each red and each blue photosite in the determined interpolation direction for that photosite;

means for interpolating, for each green photosite, red and blue colors;

means for interpolating, for each red photosite, a blue color in the determined interpolation direction for that photosite; and means for interpolating, for each blue photosite, a red color in the determined interpolation direction for that photosite.

According to still yet another aspect there is provided a computer readable medium embodying a computer program for interpolating missing colors in a color filter array comprising red, green and blue photosites, said computer program comprising:

computer program code for determining an interpletation direction for each red and each blue photosite based on local edge information;

computer program code for interpolating a green color for each red and each blue photosite in the determined interpolation direction for that photosite;

computer program code for interpolating, for each green photosite, red and blue colors;

computer program code for interpolating, for each red photosite, a blue color in the determined interpolation direction for that photosite; and computer program code for interpolating for each blue photosite, a red color in the determined interpolation direction for that photosite.

BRIEF DESCRIPTION OF THE DRAWINGS

Embodiments will now be described more fully with reference to the accompanying drawings, in which:

Figure 7C:
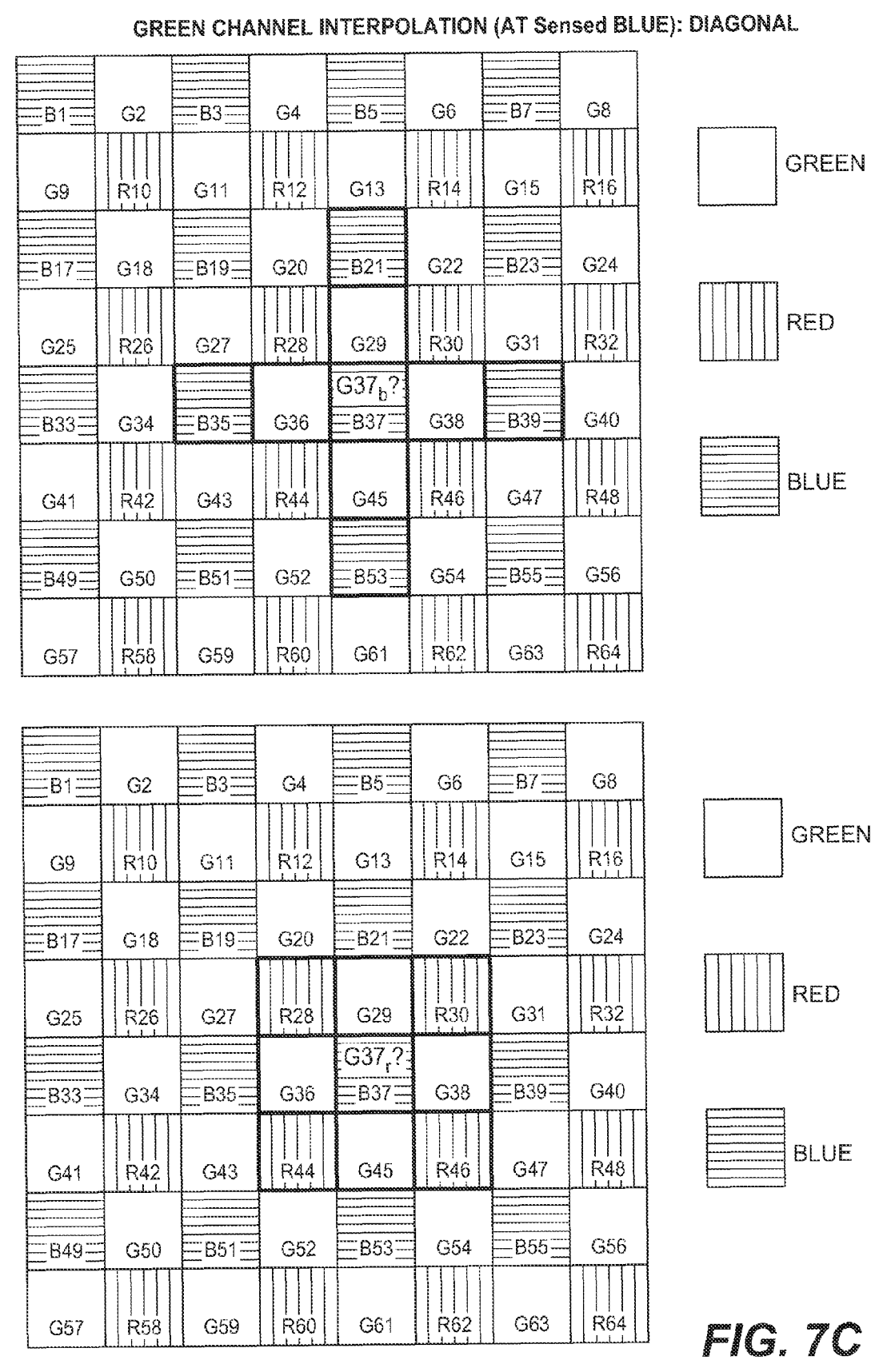

FIGS. 7A to 7E are diagrams illustrating the photosites used to determine an interpolated green color at the selected blue photosite along respective interpolation directions;

FIG. 11 is a diagram of the Bayer color filter array illustrating interpolated green colors at red and blue photosites and interpolated red and interpolated blue colors at green photosites;

Figure 13:
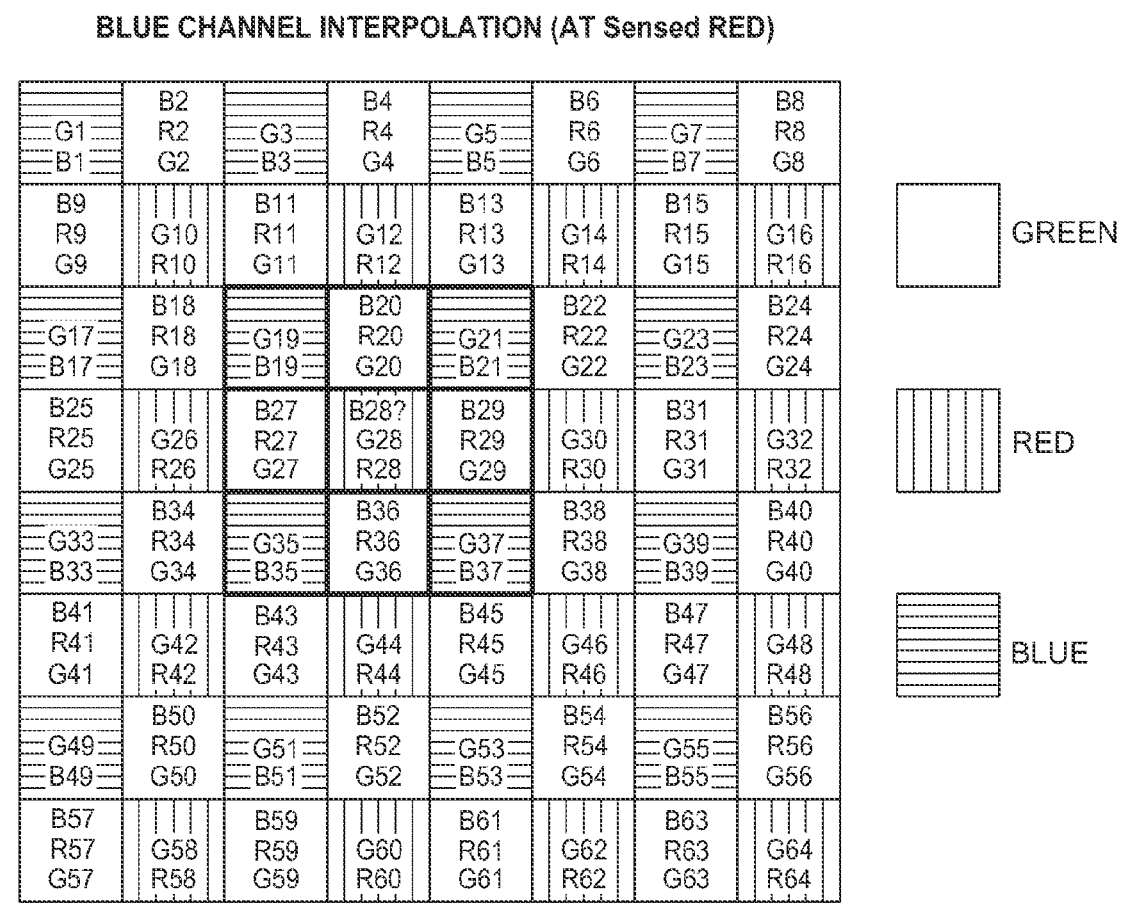

FIGS. 13 and 14 are diagrams illustrating the photosites used to determine an interpolated blue color at a selected red photosite of the Bayer color filter array;

Figure 15:
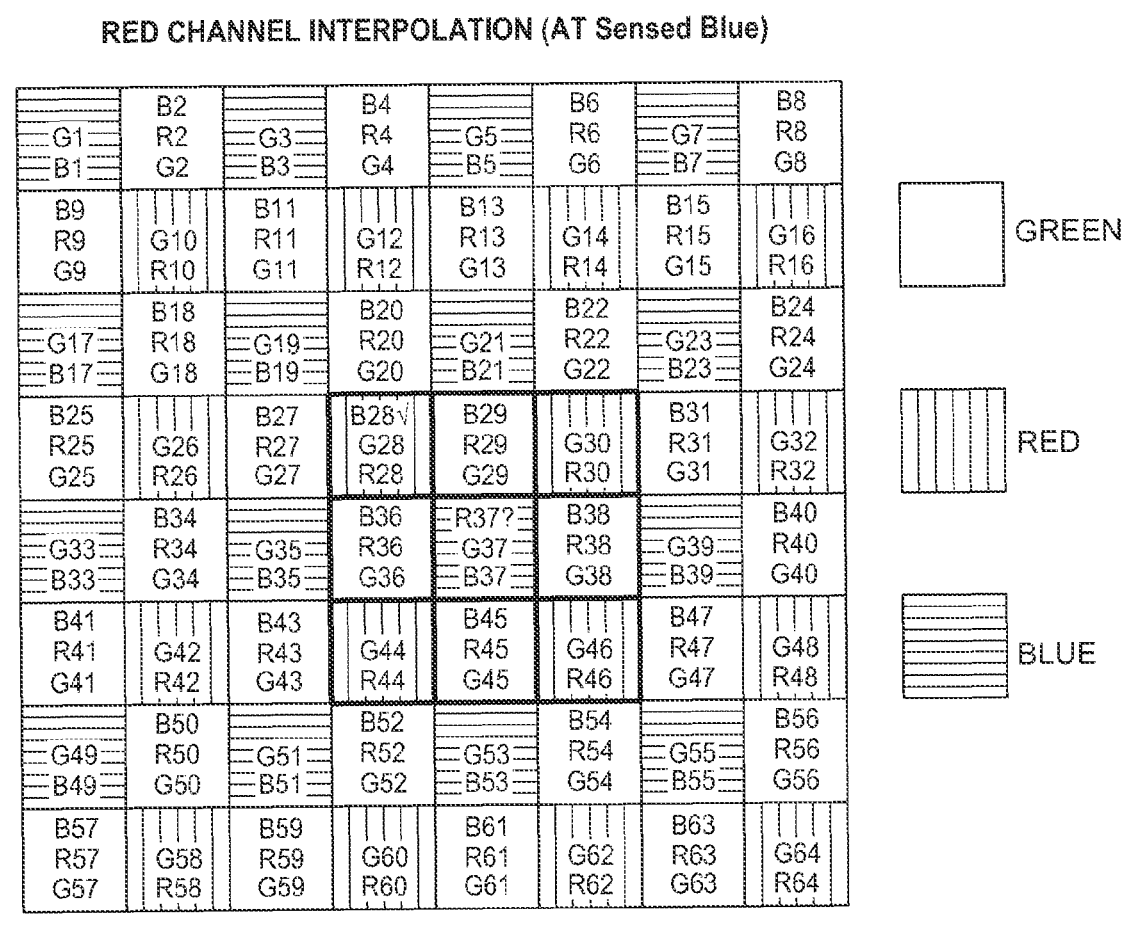

FIGS. 15 and 16 are diagrams illustrating the photosites used to determine an interpolated red color at a selected blue photosite of the Bayer color filter array;

DETAILED DESCRIPTION OF THE EMBODIMENTS

Figure 1:
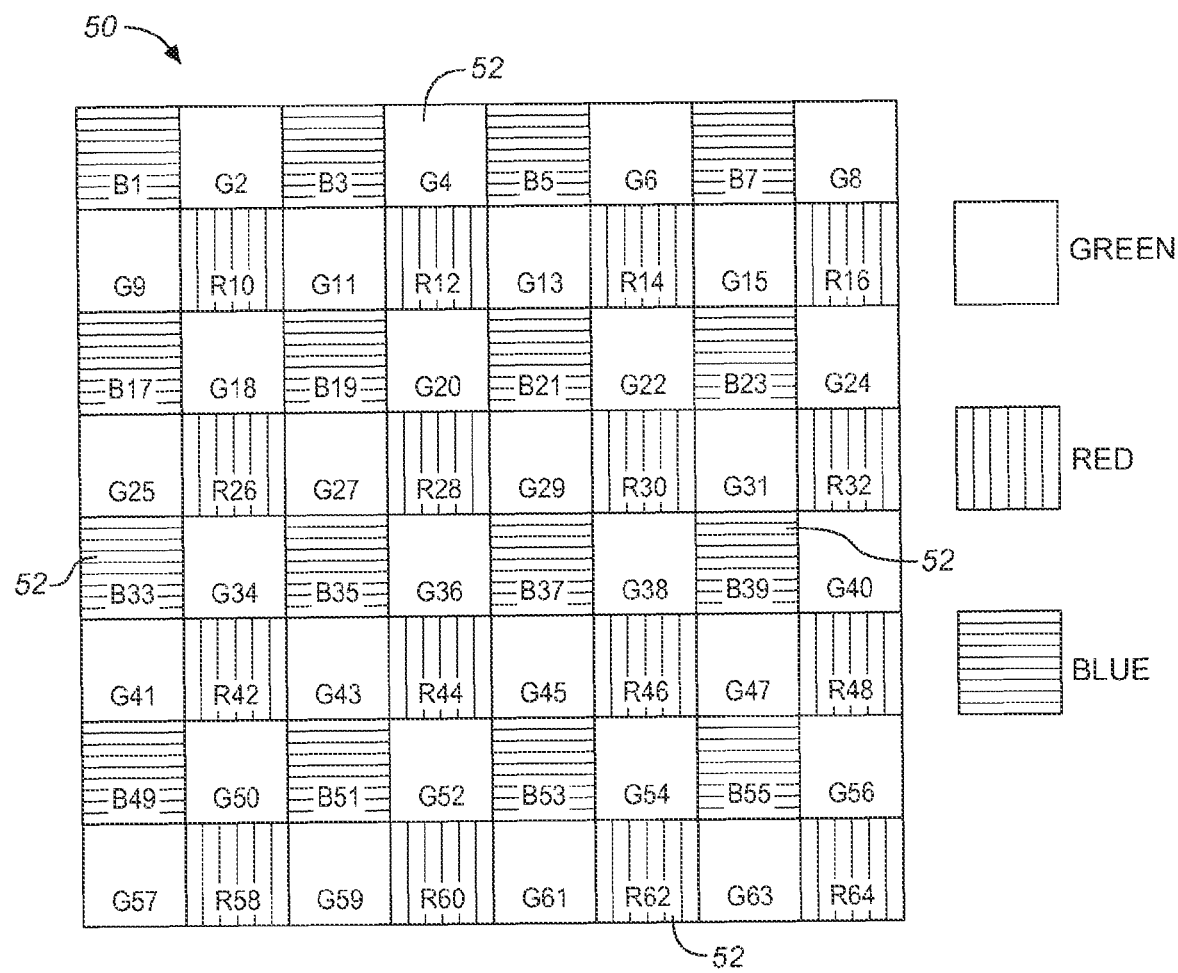
FIG. 1 is a diagram of a Bayer color filter array.

Turning now to FIG. 1, a Bayer color filter array (CFA) 50 comprising a plurality of photosites 52 and an associated legend is shown. Each photosite 52 senses one of red (R), green (G) and blue (B) colors. For ease of discussion, photosites 52 that sense a red color will be referred to as "red" photosites, photosites 52 that sense a green color will be referred to as "green" photosites, and photosites 52 that sense a blue color will be referred to as "blue" photosites. The red, green and blue photosites 52 of the Bayer CFA 50 are alphanumerically identified in order to facilitate the following description. For example, the top left photosite 52 of the Bayer CFA 50 senses a blue color, and is labeled B. The photosite directly to its right senses a green color and is labeled G2. The photosite to the right of photosite G2 senses a blue color and is labeled B3, and so forth. In the next row of the Bayer CFA 50, there are alternating green and red photosites 52 labeled G8, R9, G10, R11, G12 and so forth. As will be appreciated, using this labeling convention each photosite 52 is identified by a unique photosite number, and initially one of R, G and B color designations representing the color the photosite 52 senses.

Figure 2:
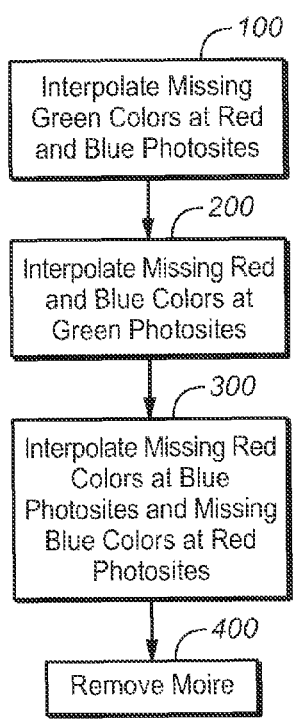
FIG. 2 is a flowchart illustrating a method for de-mosaicing a Bayer color filter array.

FIG. 2 is a flowchart illustrating the general method for de-mosaicing the Bayer CFA 50 in order to enable a full color image of a captured scene to be produced. During the method, interpolated green colors at red and blue photosites are initially determined (step 100). Interpolated red and blue colors at green photosites are then determined (step 200). Interpolated red colors at blue photosites and interpolated blue colors at red photosites are then determined (step 300) to complete de-mosaicing of the Bayer CFA 50. Moiré is then removed from the de-mosaiced Bayer CFA (step 400).

In this embodiment, during interpolation of the missing green color at each of the red and blue photosites, local edges proximate the photosite in each of the vertical, horizontal and diagonal directions are detected by comparing different pairs of proximate photosites and examining the resulting gradients. The smallest gradient, which represents to the strongest local edge is chosen as the interpolation direction for that photosite. This interpolation direction is also used during interpolation of either the missing red color or the missing blue color for that photosite. Further specifics concerning interpolation direction determination and photosite interpolation will now be described.

Figure 3A:
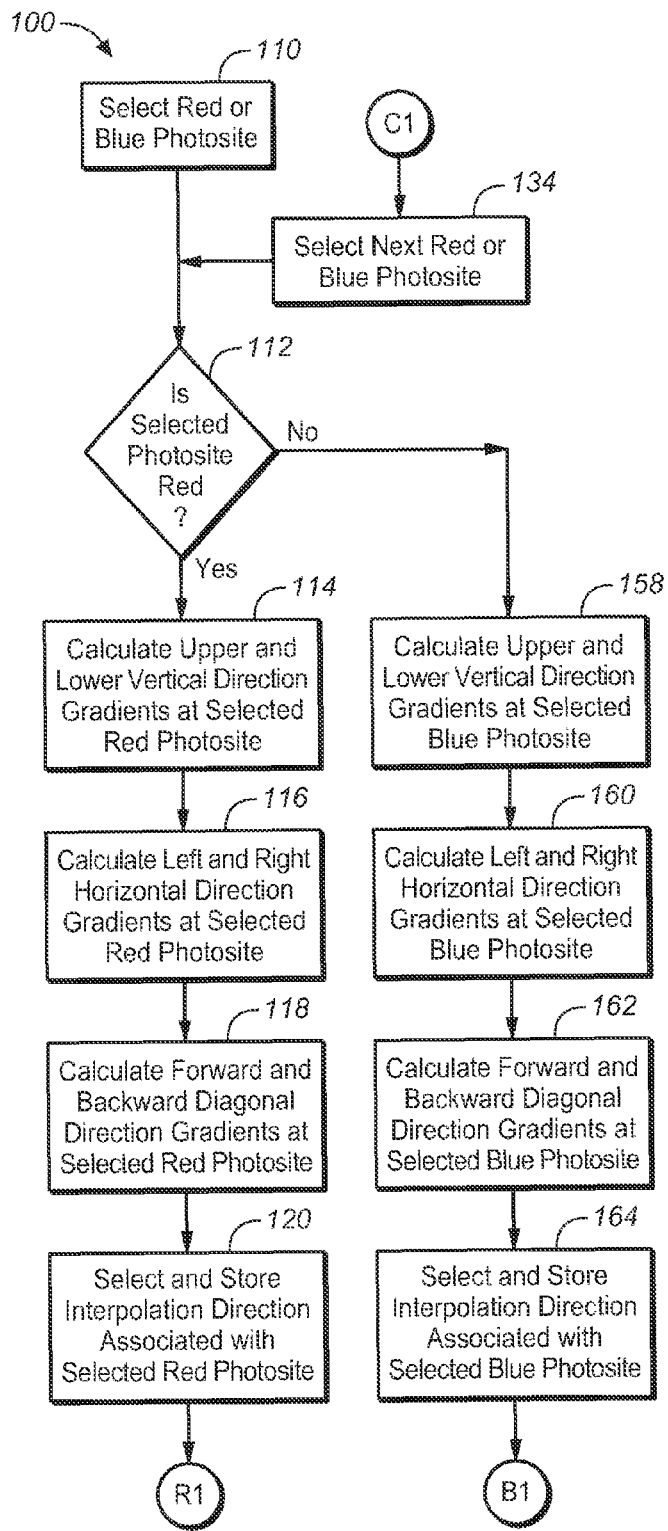
FIGS. 3A to 3C are flowcharts illustrating steps for determining interpolated green colors at red and blue photosites of the Bayer color filter array.
Figure 3B:
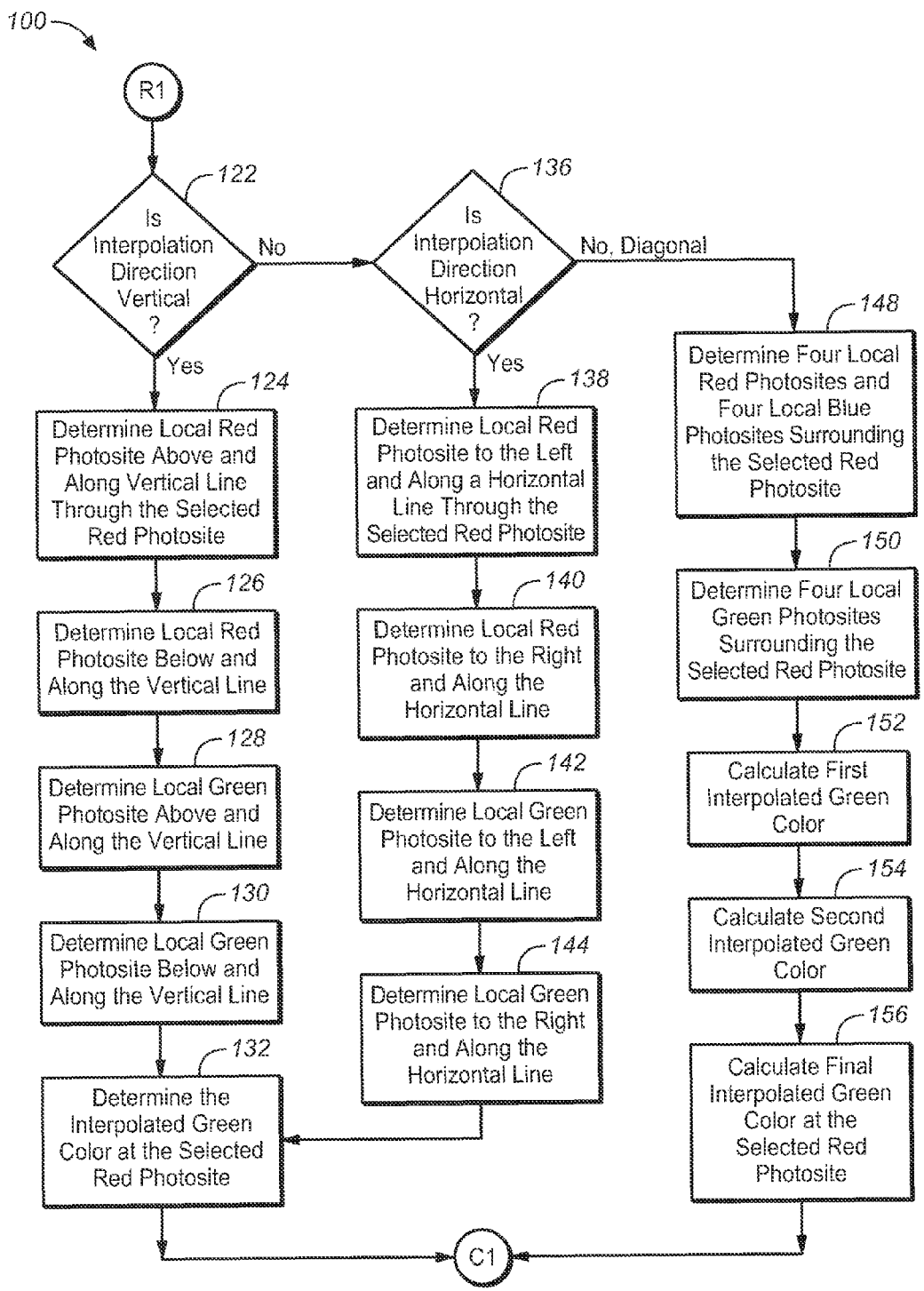
Figure 3C:
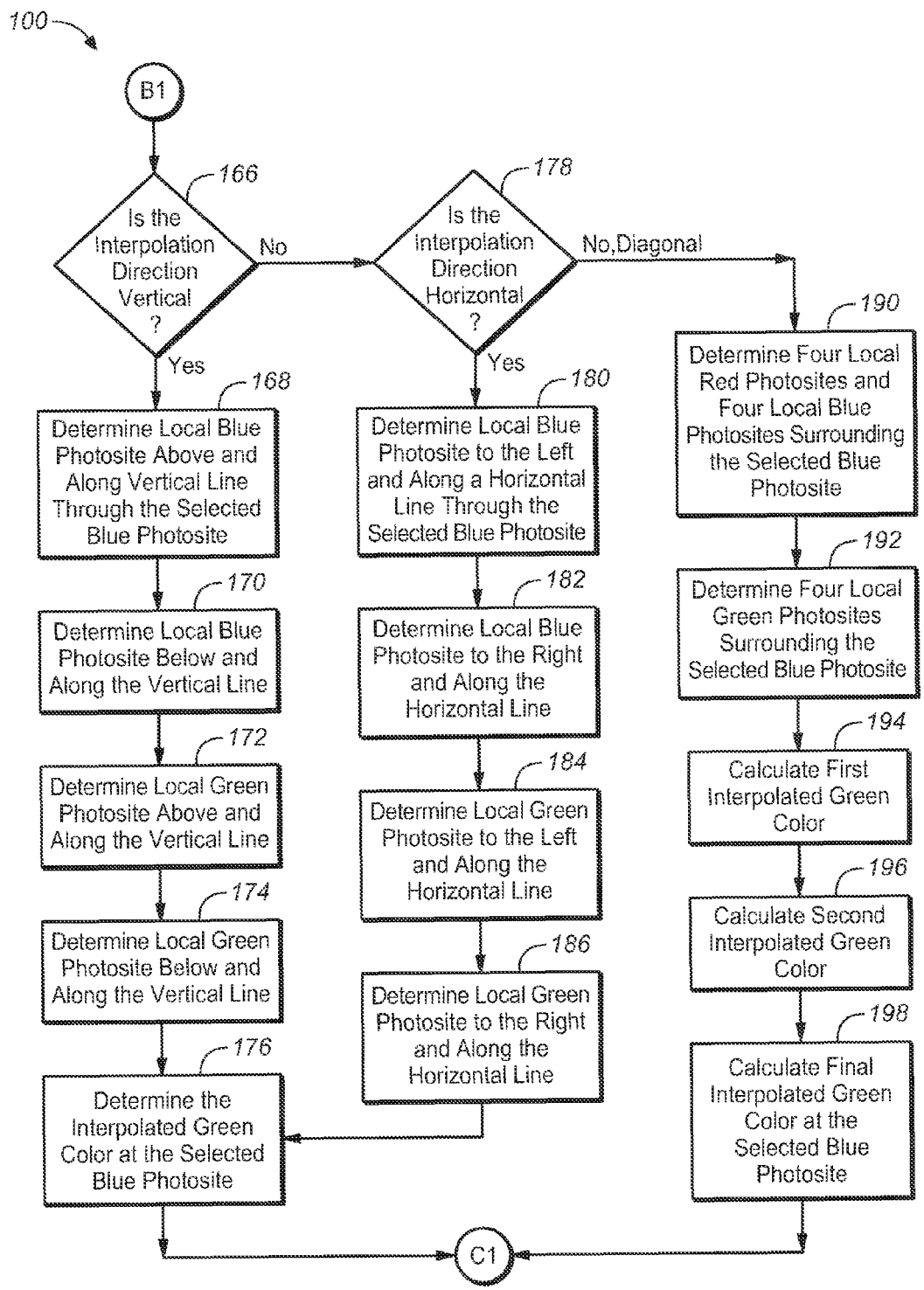

FIGS. 3A to 3C show a flowchart of the steps for determining interpolated green colors at red and blue photosites. During this process, a red or blue photosite is initially selected (step 110) and the color of the selected photosite is confirmed (step 112). If the selected photosite is a red photosite, then upper and lower vertical directional gradients, left and right horizontal directional gradients, and forward and backward diagonal directional gradients are each calculated at the selected red photosite (steps 114 to 118). During calculation of the directional gradients, different groups of photosites adjacent the selected red photosite are examined and absolute differences between different pairs of photosites in each group are determined. Each group of photosites comprises three lines of photosites, namely a central strand of photosites intersecting the selected photosite and adjacent strands of photosites that flank the central strand of photosites.

Figure 4A:
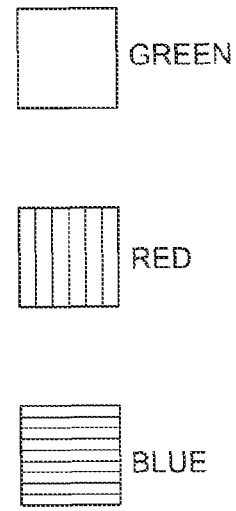
FIGS. 4A to 4F are diagrams illustrating the photosites used to determine various directional gradients for selecting an interpolation direction at a selected red photosite of the Bayer color filter array.
Figure 4A:
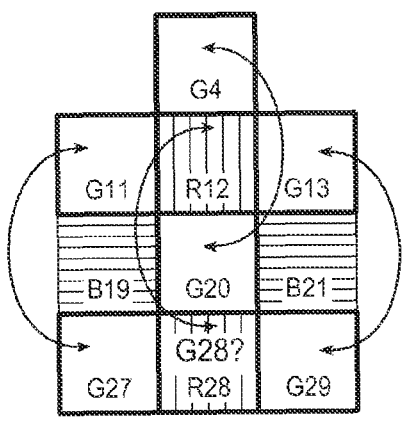
Figure 4B:
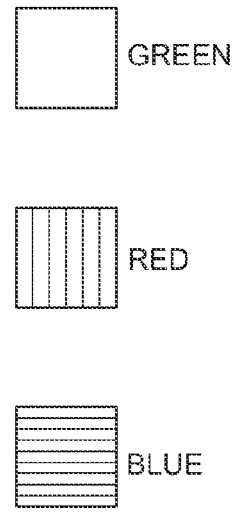
Figure 4B:
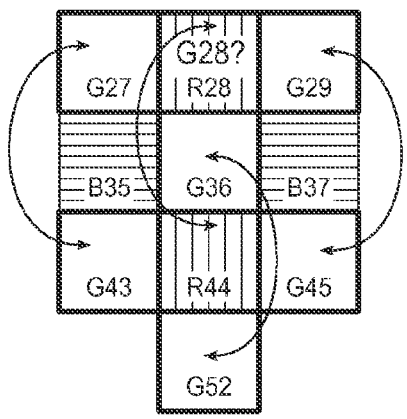
Figure 4C:
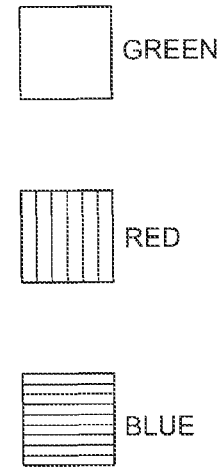
Figure 4C:
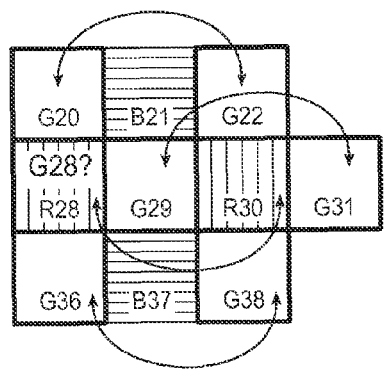
Figure 4D:
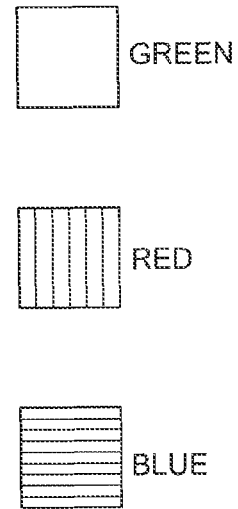
Figure 4D:
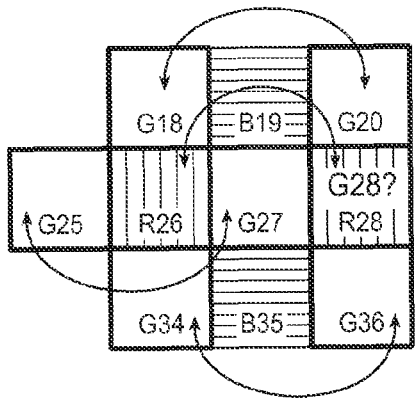

FIGS. 4A and 4D illustrate the determination of the upper and lower vertical directional gradients and the left and right horizontal directional gradients for selected red photosite R28. For the upper vertical directional gradient, local green and red photosites in a region that extends to the sides of and above the selected red photosite R28 are used. The central strand of photosites of the region comprises four (4) photosites and extends vertically upwards beginning at the selected red photosite R28. The adjacent flanking strands of photosites comprise three (3) photosites. For the lower vertical directional gradient, local green and red photosites in a region that extends to the sides of and below the selected red photosite R28 are used. The central strand of photosites of the region similarly comprises four (4) photosites and extends vertically downwards beginning at the selected red photosite R28. The adjacent flanking strands of photosites comprise three (3) photosites. For the left horizontal directional gradient, local green and red photosites in a region that extends above and below and to the left of the selected red photosite R28 are used. The central strand of photosites of the region comprises four (4) photosites and extends horizontally to the left beginning at the selected red photosite R28. The adjacent flanking strands of photosites comprise three (3) photosites. For the right horizontal directional gradient, local green and red photosites in a region that extends above and below and to the right of the selected red photosite R28 are used. The central strand of photosites of the region comprises four (4) photosites and extends horizontally to the right beginning at the selected red photosite R28. The adjacent flanking strands of photosites comprise three (3) photosites.

The upper vertical directional gradient is calculated by first determining the absolute difference between green photosites G4 and G20 positioned above the selected red photosite R28 on the central strand of photosites of the region. Absolute differences between green photosites G11 and G27 on one flanking strand of photosites and between green photosites G13 and G29 on the other flanking strand of photosites are also calculated. In addition, the absolute difference between red photosites R12 and R28 on the central strand of photosites is determined. The double headed arrows in FIG. 4A identify the photosites used to generate the absolute differences. The upper vertical directional gradient (R28_UV) at the selected red photosite R28 is the average of these four (4) absolute differences, and is calculated according to Equation 1 below:

$$R28\_UV=(|G11-G27|+|G4-G20|+|G13-G29|+|R12-R28|)/4 \quad (1)$$

The lower vertical directional gradient is calculated by first determining the absolute difference between green photosites G52 and G36 positioned below the selected red photosite R28 on the central strand of photosites of the region. Absolute differences between green photosites G27 and G43 on one flanking strand of photosites and between green photosites G29 and G45 on the other flanking strand of photosites are also calculated. In addition, the absolute difference between red photosites R44 and R28 on the central strand of photosites is determined. The double headed arrows in FIG. 4B identify the photosites used to generate the absolute differences. The lower vertical directional gradient (R28_LV) at the selected red photosite R28 is the average of these four (4) absolute differences, and is calculated according to Equation 2 below:

$$R28\_LV=(|G27-G43|+|G36-G52|+|G29-G45|+|R28-R44|)/4 \quad (2)$$

The right horizontal directional gradient is calculated by first determining the absolute difference between green photosites G29 and G31 positioned to the right of the selected red photosite R28 on the central strand of photosites of the region. Absolute differences between green photosites G20 and G22 on one flanking strand of photosites and between green photosites G36 and G38 on the other flanking strand of photosites are also calculated. In addition, the absolute difference between red photosites R28 and R30 on the central strand of photosites is determined. The double headed arrows in FIG. 4C identify the photosites used to generate the absolute differences. The right horizontal directional gradient (R28_RH) at the selected red photosite R28 is the average of these four (4) absolute differences, and is calculated according to Equation 3 below:

$$R28\_RH=(|G20-G22|+|G29-G31|+|G36-G38|+|R28-R30|)/4 \quad (3)$$

The left horizontal directional gradient is calculated by first determining the absolute difference between green photosites G25 and G27 positioned to the left of the selected red photosite R28 on the central strand of photosites of the region. Absolute differences between green photosites G18 and G20 on one flanking strand of photosites and between green photosites G34 and G36 on the other flanking strand of photosites are also calculated. In addition the absolute difference between red photosites R26 and R28 on the central strand of photosites is determined. The double headed arrows in FIG. 4D identify the photosites used to generate the absolute differences. The left horizontal directional gradient (R28_LH) at the selected red photosite R28 is the average of these four (4) absolute differences and is calculated according to Equation 4 below:

$$R28\text{-}LH=(|G18-G20|+|G25-G27|+|G34-G36|+|R26-R28|)/4 \quad (4)$$

Because the green photosites in the Bayer CFA 50 are arranged in a quincunx pattern, there is green color information in photosites adjacent the selected red photosite that can be used to assist in determining local edges when the edge direction is vertical or horizontal, as described above. However, since there are no green photosites along diagonal strands that intersect the selected red photosite, the forward and rearward diagonal directional gradients are calculated in a different manner.

Figure 4E:
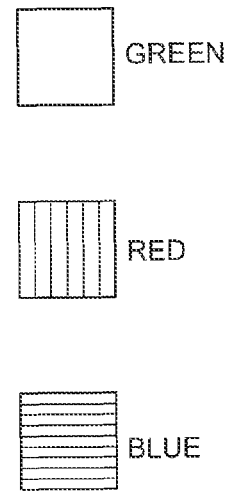
Figure 4E:
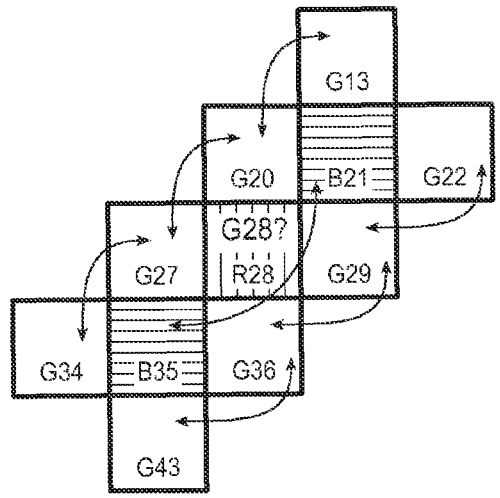
Figure 4F:
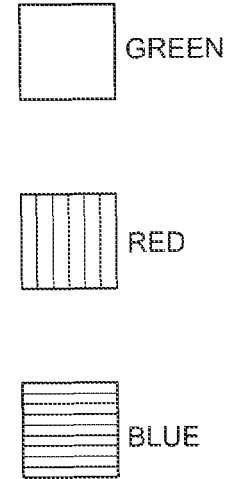
Figure 4F:
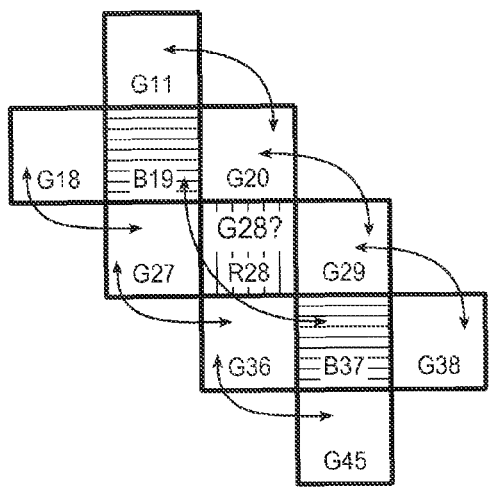

Turning now to FIGS. 4E and 4F, determination of the forward diagonal and rearward diagonal directional gradients for selected red photosite R28 is illustrated. For the forward diagonal directional gradient, local green and blue photosites in a diagonal region that surrounds the selected red photosite R28 are used. The central strand of photosites of the region comprises three (3) photosites and extends upwardly in a left to right direction. The selected red photosite R28 is at the midpoint of the central strand of photosites. The adjacent flanking strands of photosites comprise four (4) photosites. For the rearward diagonal directional gradient, local green and blue photosites in a diagonal region that surrounds the selected red photosite R29 are similarly used. The central strand of photosites of the region comprises three (3) photosites and extends upwardly in a right to left direction. The selected red photosite R28 is at the midpoint of the central strand of photosites. The adjacent flanking strands of photosites comprise four (4) photosites.

The forward diagonal directional gradient is calculated by first determining the absolute difference between blue photosites B21 and B35 on the central strand of photosites of the region. Absolute differences between green photosites G13 and G20, between green photosites G20 and G27 and between green photosites G27 and G34 on one flanking strand of photosites and absolute differences between green photosites G22 and G29, between green photosites G29 and G36, and between green photosites G36 and G43 on the other flanking strand of photosites are also determined. The double headed arrows in FIG. 4E identify the photosites used to generate the absolute differences. The forward diagonal directional gradient (R28_FD) at the selected red photosite R28 is the average of the seven (7) absolute differences and is calculated according to Equation 5 below:

$$R28\_FD=(|G13-G20|+|G20-G27|+|G27-G34|+|G22-G29|+|G29-G36|+|G36-G43|+|B21-B35|)/7 \quad (5)$$

The backward diagonal directional gradient is calculated by first determining the absolute difference between blue photosites B19 and B37 on the central strand of photosites of the region. Absolute differences between green photosites G11 and G20, between green photosites G20 and G29 and between green photosites G29 and G38 on one flanking strand of photosites and absolute differences between green photosites G18 and G27, between green photosites G27 and G36 and between green photosites G36 and G45 on the other flanking strand of photosites are also determined. The double headed arrows in FIG. 4F identify the photosites used to generate the absolute differences. The backward diagonal directional gradient (R28_BD) at the selected red photosite R28 is the average of the seven (7) absolute differences and is calculated according to Equation 6 below:

$$R28\_BD=(|G11-G20|+|G20-G29|+|G29-G38|+|G18-G27|+|G27-G36|+|G36-G45|+|B19-B37|)/7 \quad (6)$$

The various directional gradients are calculated in order to select an interpolation direction that runs along an edge at the selected photosite rather than across an edge. Interpolation along an edge (rather than across it) retains the sharpness and accuracy of the results. It has been found that when interpolating diagonal lines using alternating ones of horizontal and vertical lines or interpolating in all directions, artifacts such as step patterns or flat discolored lines result. The step patterns result when gradient analyses across the photosites of the CFA continually identify a repetitive horizontal and vertical sequence along a diagonal line. Flat spots occur using all-direction interpolation, or when an interpolated color lies above a maximum or below a minimum of the sensed colors adjacent green photosites. As such, determining diagonal gradients for possible diagonal interpolation reduces the chances that such step patterns or flat spots occur.

Once the various directional gradients have been calculated at steps 114 to 118, the direction corresponding to the smallest calculated directional gradient is selected as the interpolation direction for the selected red photosite, as it is the direction along which a local edge most likely runs. The selected interpolation direction is then stored in association with the selected red photosite (step 120) for use in determining the interpolated green color and the interpolated blue color at the selected red photosite, as will be described.

Two vertical (upper and lower) and two horizontal (left and right) directional gradients are calculated to take into account the fact that local photosites having significantly different intensities may exist. If only a single vertical and/or a single horizontal directional gradient were calculated, significantly different photosite intensities may result in the calculation of a directional gradient that has a magnitude greater than is needed to identify the local edge. This could result in the improper directional gradient being used to select the interpolation direction. In this embodiment, as upper vertical and lower vertical gradients and left horizontal and right horizontal gradients are calculated separately, a significantly different intensity in one of the gradient calculations does not disqualify the other of the gradient calculations from indicating an edge direction.

Once the interpolation direction has been selected and stored, color dependency interpolation is conducted. When performing color dependency interpolation, it is assumed that the color channels (i.e., red, blue and green channels) are correlated within the color difference space such that differences (k=G−R or k=G−B) are relatively constant within the boundaries of an image object. Across boundaries of the image object, this assumption fails. Therefore, interpolation is conducted in the selected interpolation direction (i.e. along the local edge and not across it) so that the color dependency assumption holds true. Accordingly, following step 118, if the selected and stored interpolation direction for the selected red photosite is vertical (step 122), then local red and green photosites on a vertical strand of photosites running through the selected red photosite both above and below the selected red photosite are determined (steps 124 to 130). The interpolated green color G at the selected red photosite is then calculated using color differencing based on the determined local red and green photosites (step 132).

Following the earlier example and assuming that red photosite R28 has been selected, red photosite R12 and green photosite G20 are the local red and green photosites on the vertical strand of photosites above the selected red photosite R28. Red photosite R44 and green photosite G36 are the local red and green photosites on the vertical strand of photosites below the selected red photosite R28. The upper average r20 and lower average r36 are calculated according to Equations 7 and 8 below:

$$r20=(R12+R28)/2 \quad (7)$$

$$r36=(R44+R28)/2 \quad (8)$$

An upper color difference k20 and a lower color difference k36 are then calculated according to Equations 9 and 10 below:

$$k20=(G20-r20)/2 \quad (9)$$

$$k36=(G36-r36)/2 \quad (10)$$

The interpolated green color G28 at the selected red photosite R28 is then calculated according to Equation 11 below:

$$G28=R28+(k20+k36)/2 \quad (11)$$

If the selected and stored interpolation direction for the selected red photosite is horizontal (step 136), then local red and green photosites on a horizontal strand of photosites running through the selected red photosite both to the left and to the right of the selected red photosite are determined (steps 138 to 144). The interpolated green color G at the selected red photosite is similarly determined using color differencing based on the determined local red and green photosites (step 132).

Again following the earlier example and assuming that the red photosite R28 has been selected, red photosite R26 and green photosite G27 are the local red and green photosites on the horizontal strand of photosites to the left of the selected red photosite R28. Red photosite R30 and green photosite G29 are the local red and green photosites on the horizontal strand of photosites to the right of the selected red photosite R28. The left average r27 and the right average r29 are calculated according to Equations 12 and 13 below:

$$r27=(R26+R28)/2 \quad (12)$$

$$r29=(R30+R28)/2 \quad (13)$$

Left and right color differences k27 and k29 are then calculated, according to Equations 14 and 15 below:

$$k27=(G27-r27)/2 \quad (14)$$

$$k29=(G29-r29)/2 \quad (15)$$

The interpolated green color G28 at the selected red photosite R28 is then calculated according to Equation 16 below:

$$G28=R28+(k27+k29)/2 \quad (16)$$

If the selected and stored interpolation direction for the selected red photosite is either a forward diagonal or a backward diagonal, four (4) red photosites, four (4) blue photosites and four (4) green photosites surrounding the selected red photosite are determined (steps 148 and 150). A first interpolated green color G based on determined red photosites and a second interpolated green color G based on determined blue photosites are each calculated using color differencing (steps 152 and 154). The interpolated green color G at the selected red photosite is then calculated based on the first and second interpolated green colors and two (2) of the four (4) local blue photosites (step 156). If the selected interpolation direction is a forward diagonal, the two (2) local blue photosites are on a forward diagonal strand of photosites running through the selected red photosite 28. Otherwise, the two (2) local blue photosites are on a backward diagonal strand of photosites running through the selected red photosite 28.

As will be appreciated, the diagonal interpolation is different from the vertical or horizontal interpolation. If red and green color differencing interpolation were conducted, the result might yield a different interpolated green color than would a blue and green color differencing interpolation. As such, the first and second interpolated green colors are calculated and averaged to yield the final interpolated green color for the selected red photosite.

Figure 5A:
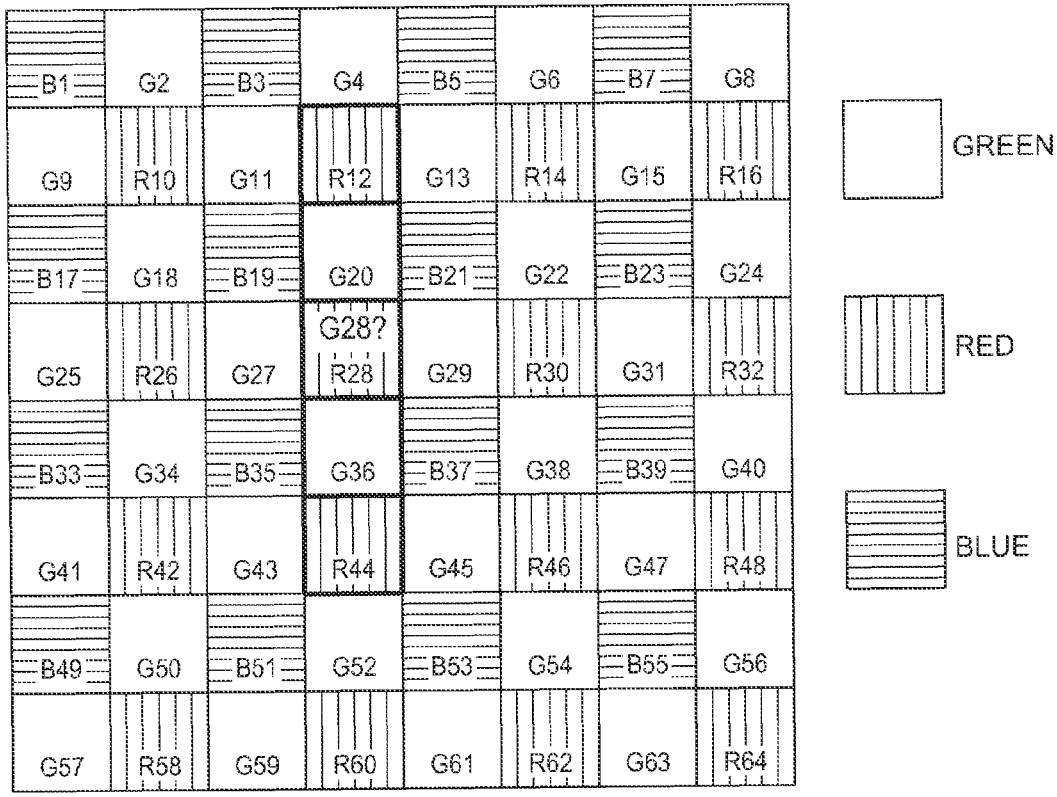
FIGS. 5A to 5E are diagrams illustrating the photosites used to determine an interpolated green color at the selected red photosite along respective interpolation directions.
Figure 5A:
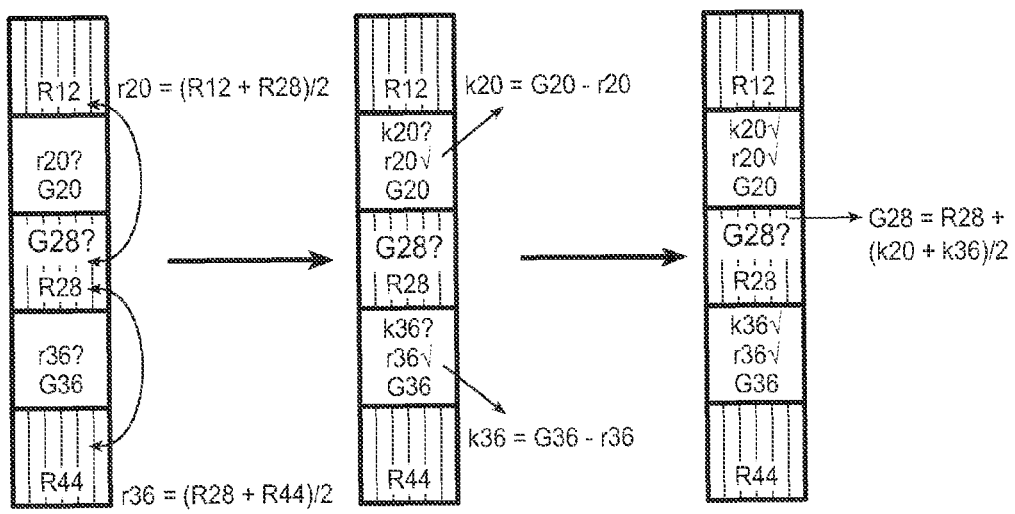
Figure 5B:
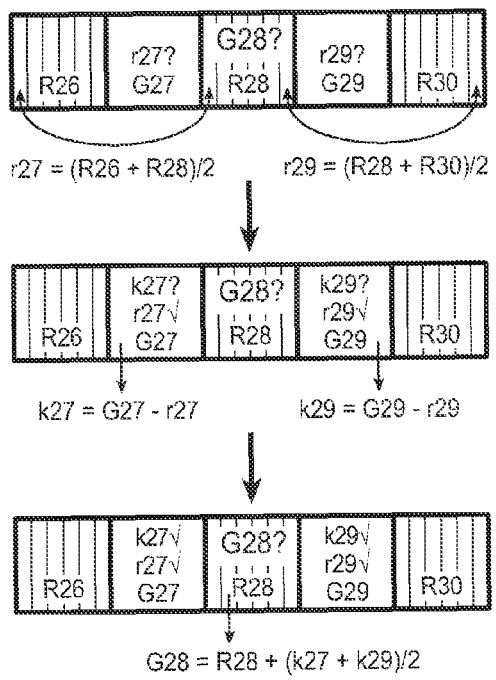
Figure 5B:
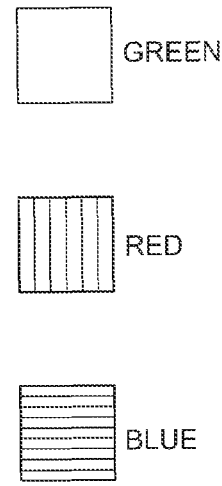
Figure 5C:
Figure 5C:
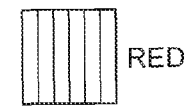
Figure 5C:
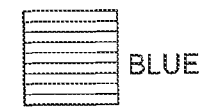
Figure 5C:
Figure 5C:
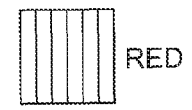
Figure 5C:
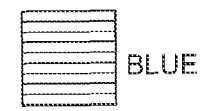

Thus, with reference to FIG. 5C and following the earlier example assuming that red photosite R28 has been selected, at steps 148 and 150, red photosites R26, R12, R30 and R44, green photosites G27, G20, G29 and G36, and blue photosites B19, B21, B35 and B37 are used to determine the interpolated green color at the selected red photosite R28.

Figure 5D:
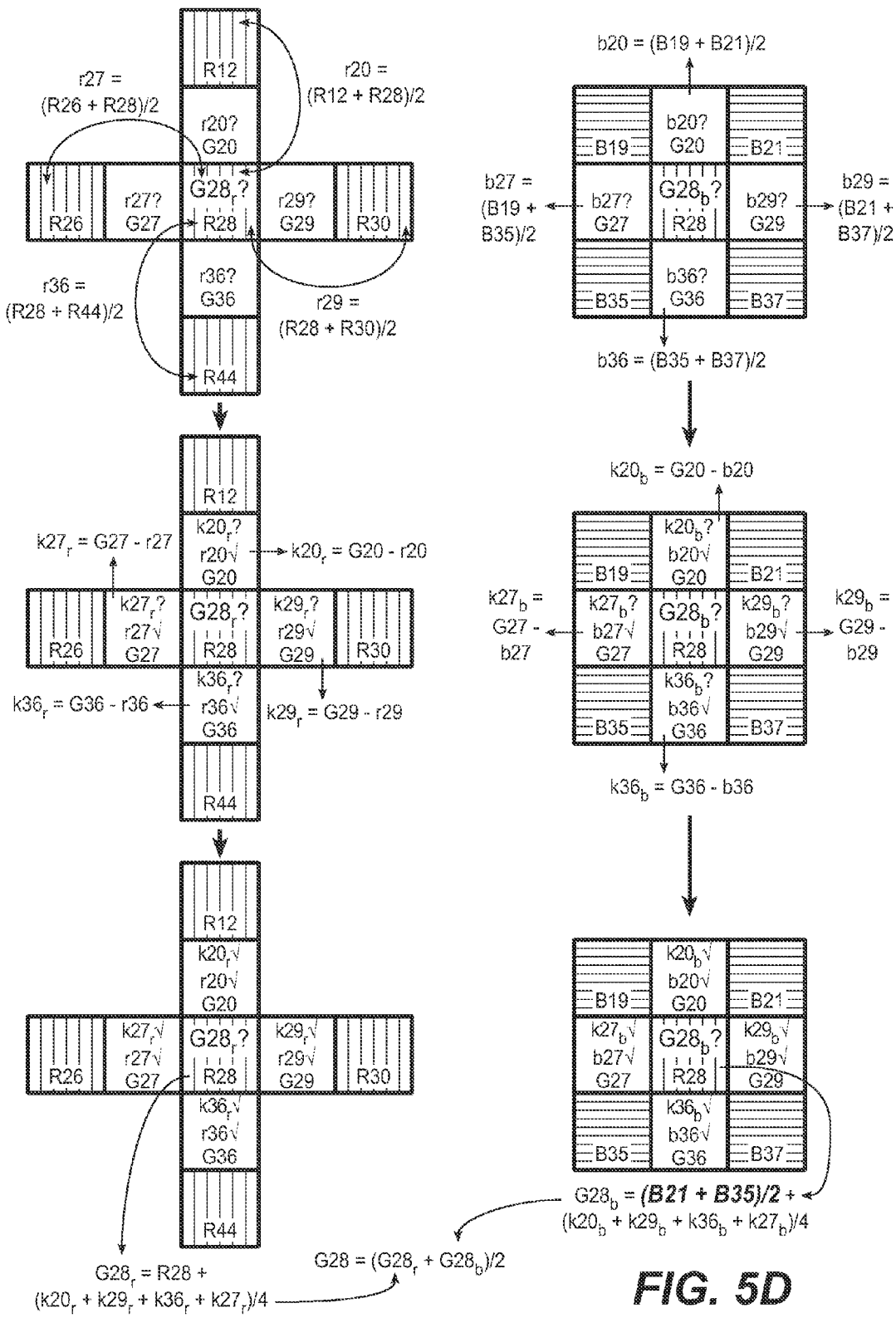

FIG. 5D shows the progression of calculations for determining the interpolated green color G28 at the selected red photosite R28 when the interpolation direction is the forward diagonal. The left side of FIG. 5D shows the progression of calculations made in order to yield the first interpolated green color $G28_r$. The right side of FIG. 5D shows the progression of calculations made in order to yield the second interpolated green color $G28_b$. On the left side of FIG. 5D, first left r27, first upper r20, first right r29 and first lower r36 averages of, respectively, the red photosites adjacent the selected red photosite R28 are calculated according to Equations 17 to 20 below:

$$r27=(R26+R28)/2 \quad (17)$$

$$r20=(R12+R28)/2 \quad (18)$$

$$r29=(R30+R28)/2 \quad (19)$$

$$r36=(R44+R28)/2 \quad (20)$$

First left $k27_r$, first upper $k20_r$, first right $k29_r$ and first lower $k36_r$ color differences are then calculated according to Equations 21 to 24 below:

$$k27_r=(G27-r27)/2 \quad (21)$$

$$k20_r=(G20-r20)/2 \quad (22)$$

$$k29_r=(G29-r29)/2 \quad (23)$$

$$k36_r=(G36-r36)/2 \quad (24)$$

The first interpolated green color $G28_r$ is then calculated according to Equation 25 below:

$$G28_r=R28+(k27_r+k20_r+k29_r+k36_r)/4 \quad (25)$$

The second interpolated green color $G28_b$ is calculated in a similar manner. With reference to the right side of FIG. 5D, second left b27, second upper b20, second right b29 and second lower b36 averages of pairs of local blue photosites are each calculated according to Equations 26 to 29 below:

$$b27=(B19+B35)/2 \quad (26)$$

$$b20=(B19+B21)/2 \quad (27)$$

$$b29=(B21+B37)/2 \quad (28)$$

$$b36=(B35+B37)/2 \quad (29)$$

Second left $k27_b$, second upper $k20_b$, second right $k29_b$ and second lower $k36_b$ color differences are then calculated according to Equations 30 to 33 below:

$$k27_b=(G27-b27)/2 \quad (30)$$

$$k20_b=(G20-b20)/2 \quad (31)$$

$$k29_b=(G29-b29)/2 \quad (32)$$

$$k36_b=(G36-b36)/2 \quad (33)$$

The second interpolated green color $G28_b$ is then calculated by adding a diagonal average of the blue photosites B21 and B35 (which are along the forward diagonal line through the red selected photosite R28) and the average of the calculated second left, second upper, second right and second lower color differences, according to Equation 34 below:

$$G28_b=(B21+B35)/2+(k27_b+k20_b+k29_b+k36_b)/4 \quad (34)$$

The final interpolated green color G28 at the selected red photosite R28 is the average of the first and second interpolated green colors calculated above, according to Equation 35 below:

$$G28=(G28_r+G28_b)/2 \quad (35)$$

Figure 5E:
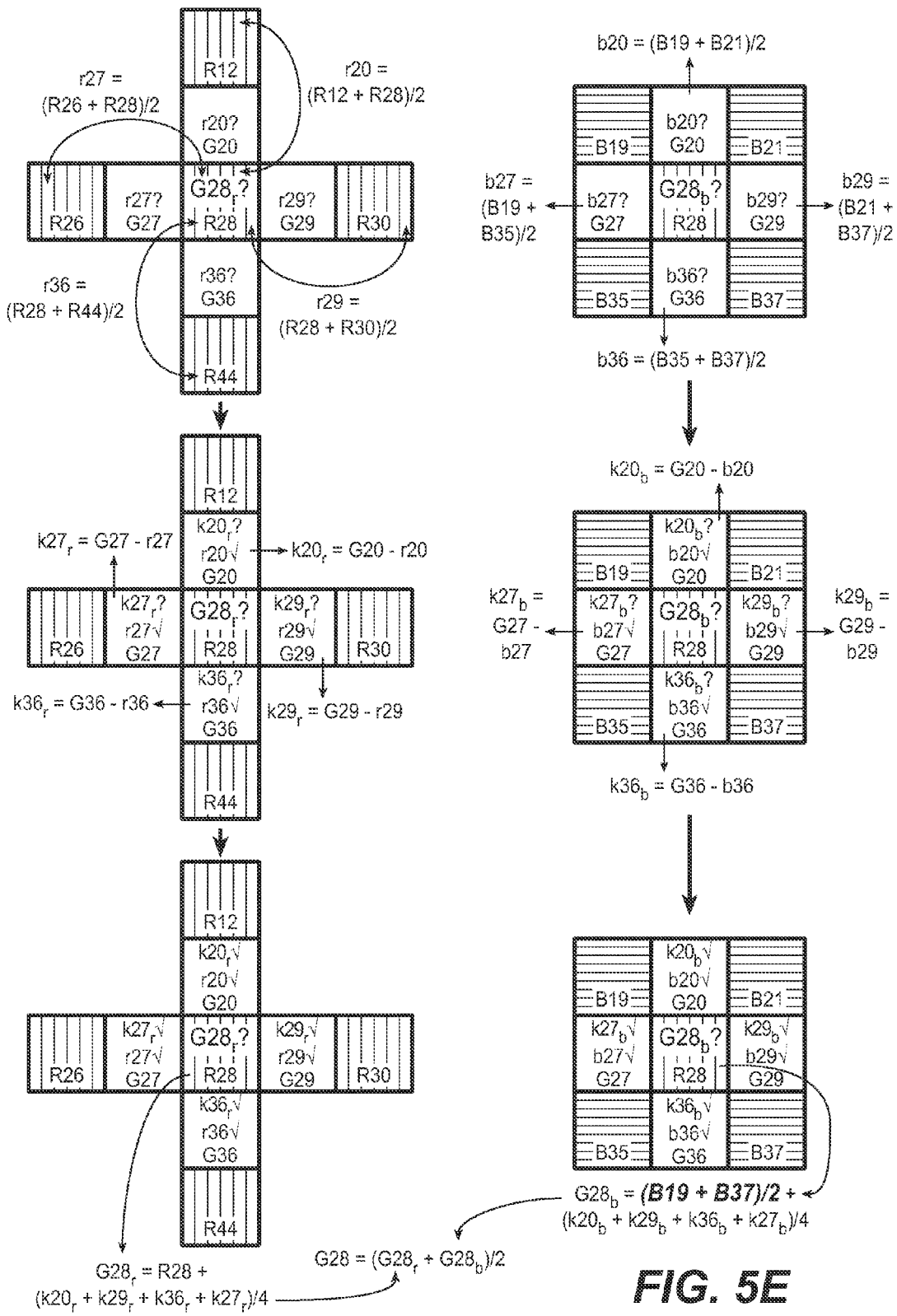
Figure 6A:
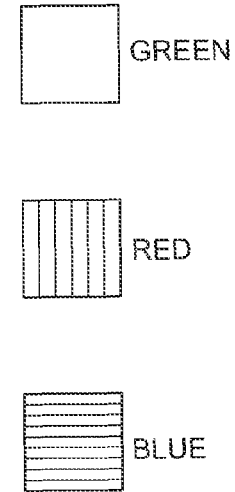
FIGS. 6A to 6F are diagrams illustrating the photosites used to determine various directional gradients for selecting an interpolation direction at a selected blue photosite of the Bayer color filter array.
Figure 6A:
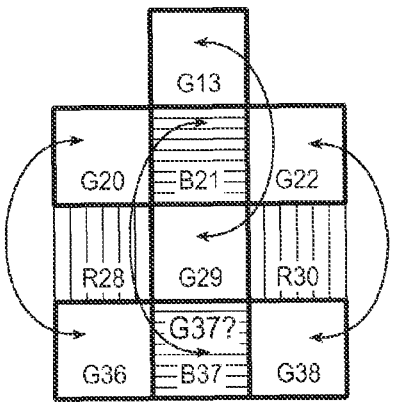
Figure 6B:
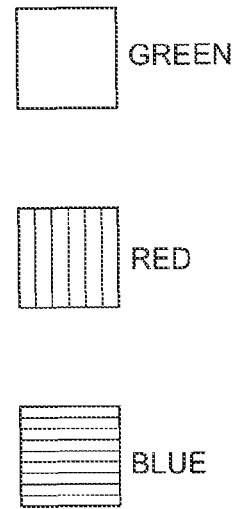
Figure 6B:
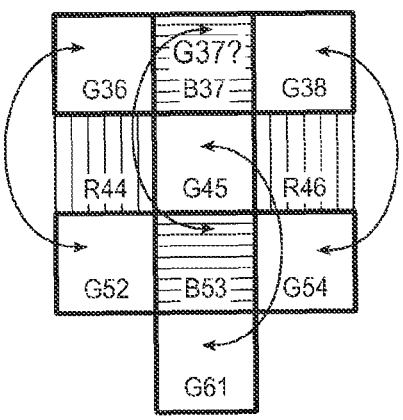
Figure 6C:
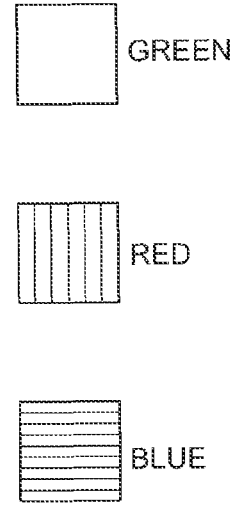
Figure 6C:
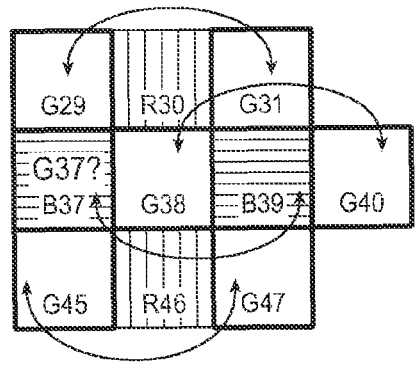
Figure 6D:
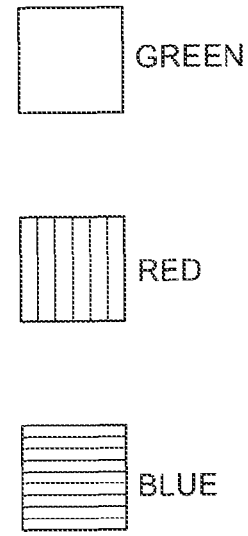
Figure 6D:
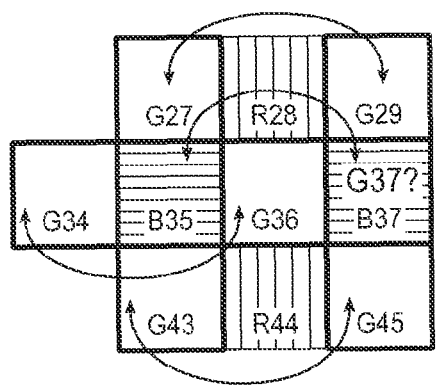
Figure 6E:
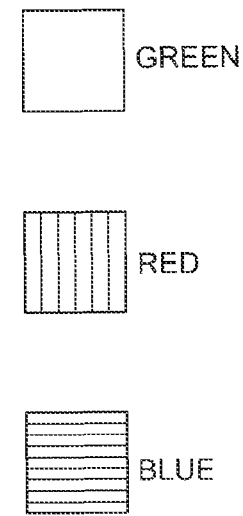
Figure 6E:
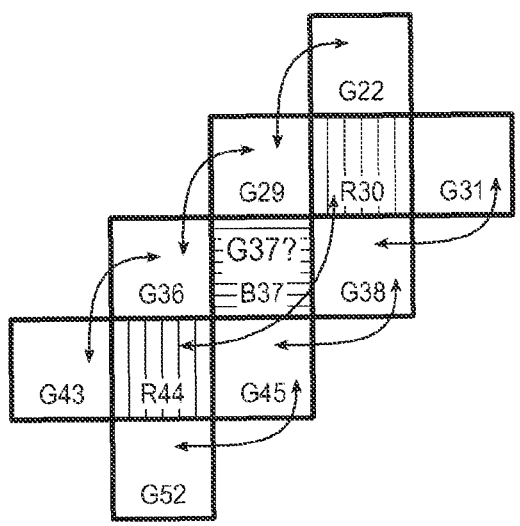
Figure 6F:
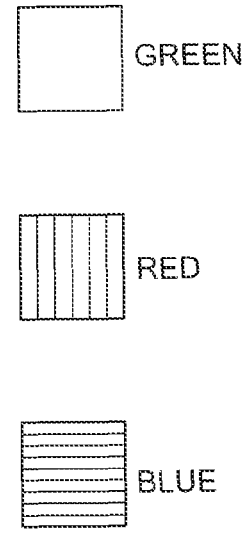
Figure 6F:
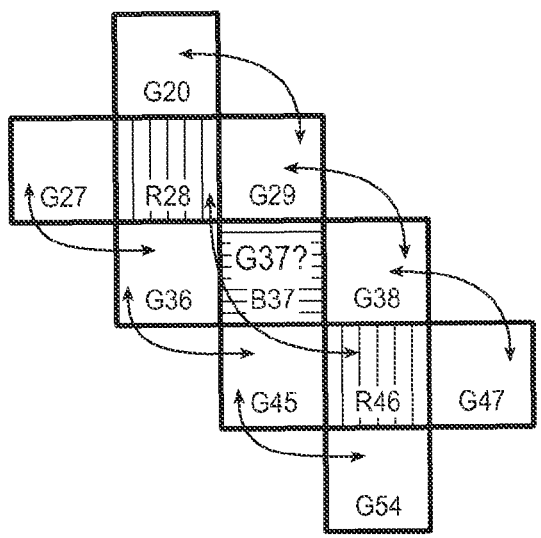
Figure 7A:
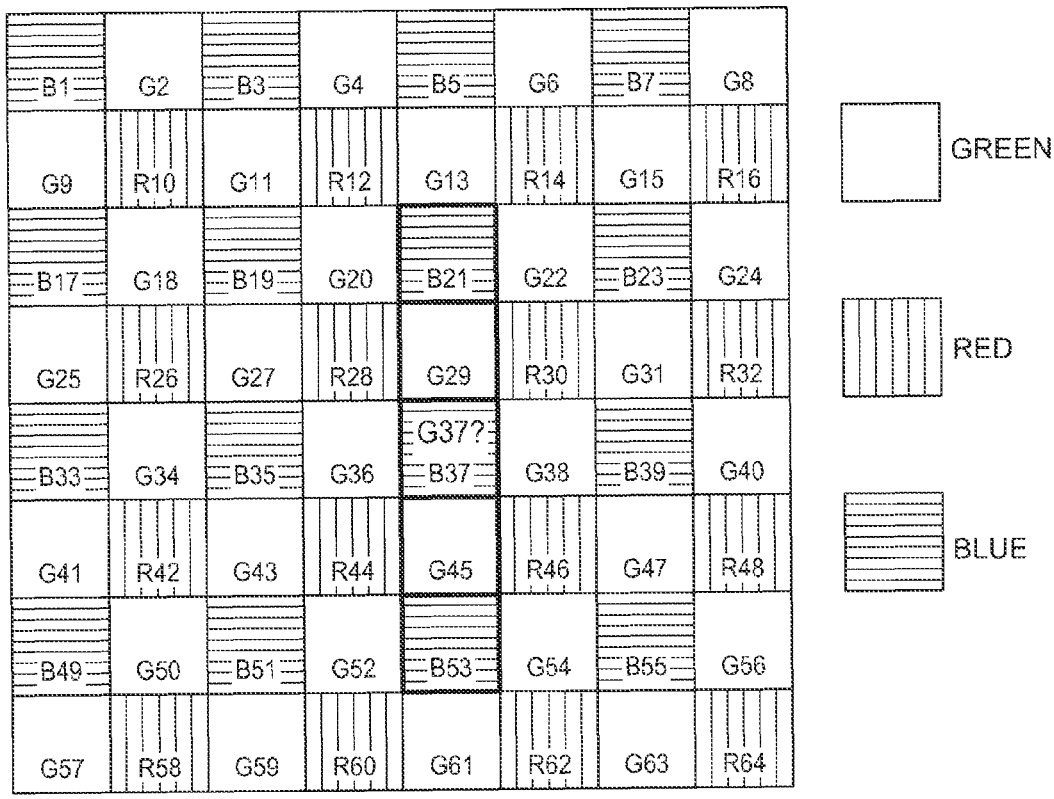
Figure 7A:
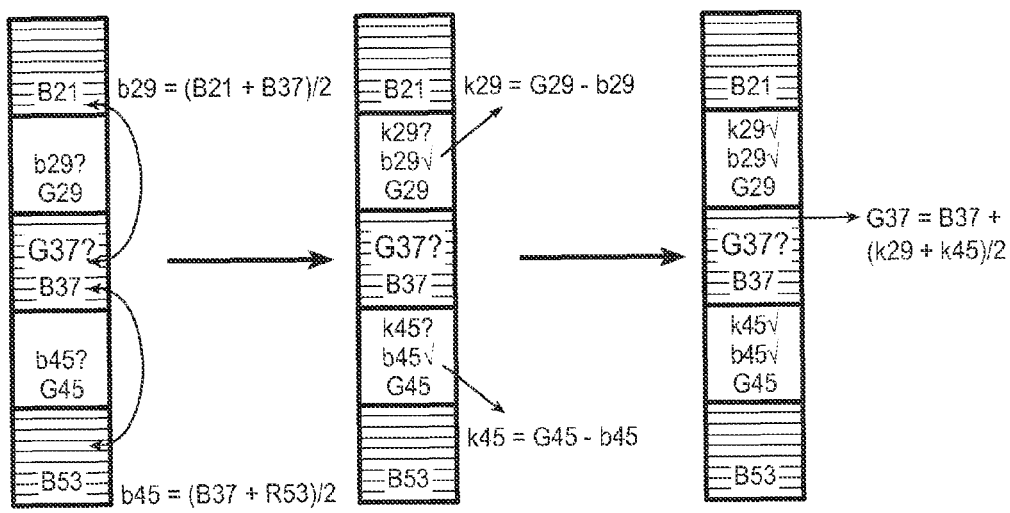
Figure 7B:
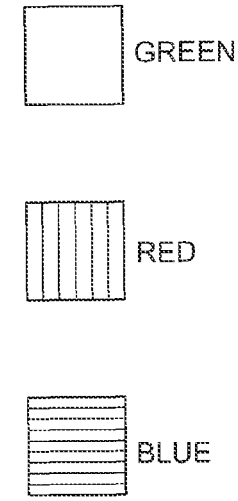
Figure 7B:
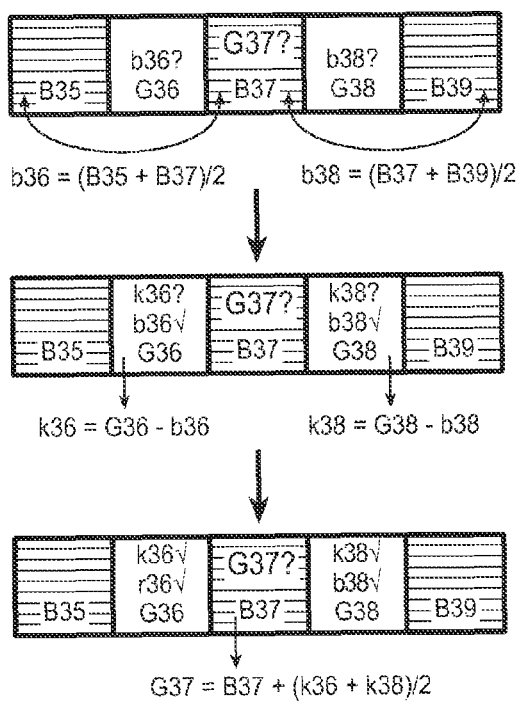
Figure 7D:
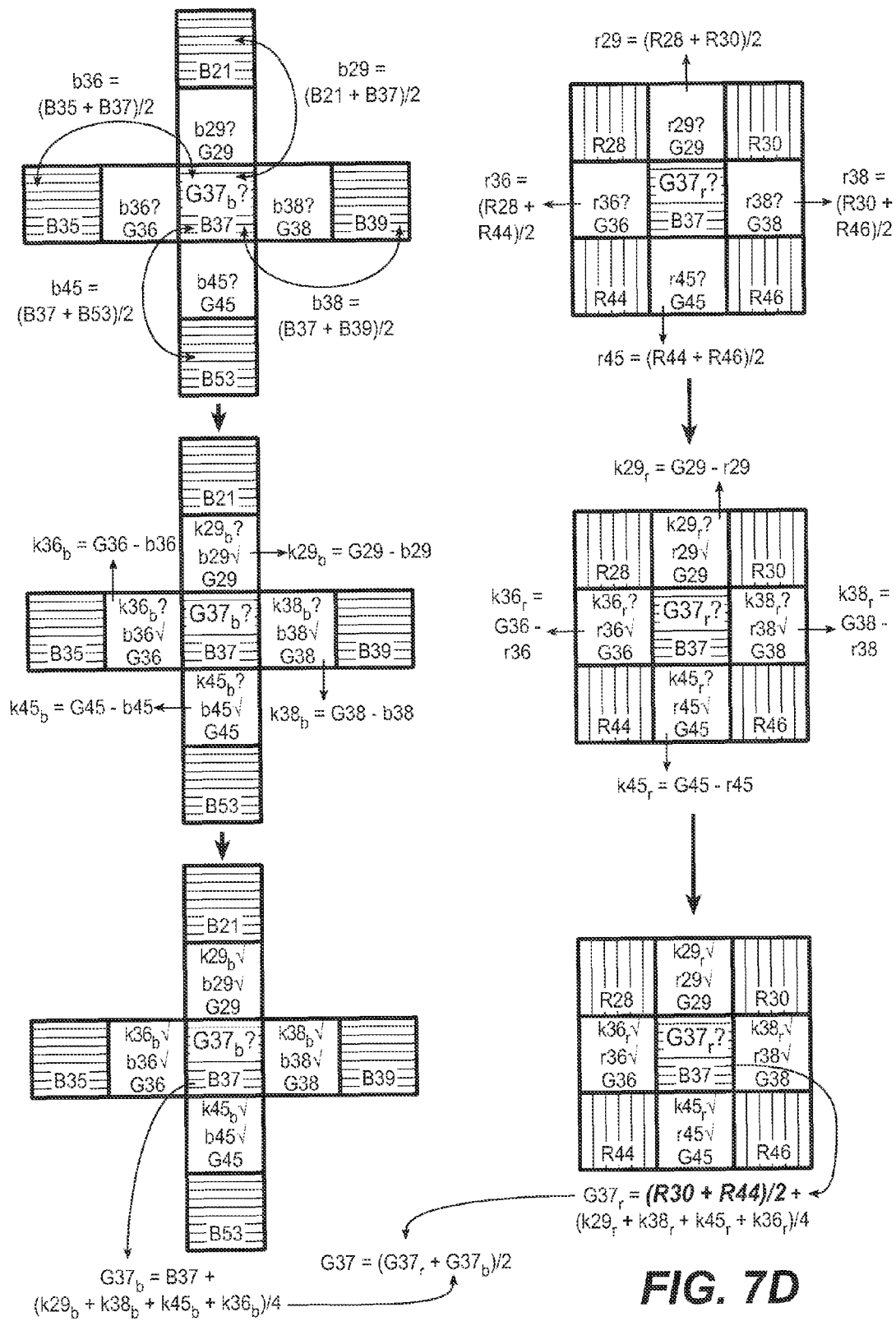
Figure 7E:
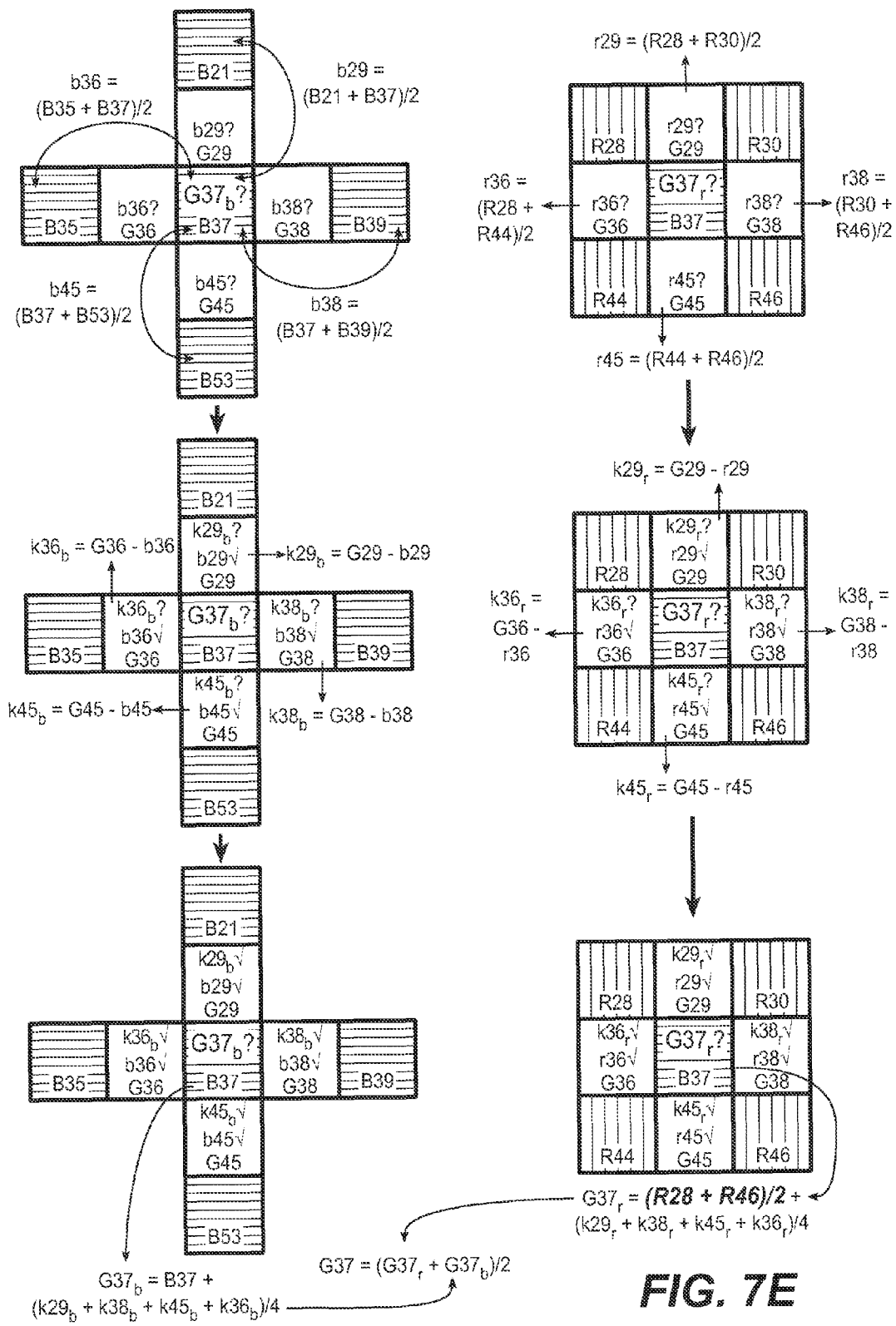

FIG. 5E shows the progression of calculations for determining the interpolated green color G28 at the selected red photosite R28 when the interpolation direction is a backward diagonal. It will be appreciated that the progression of calculations shown in FIG. 5E is almost the same as that shown in FIG. 5D and described above. However, in FIG. 5E the calculation of the second interpolated green color $G28_b$ uses local blue photosites along the backward diagonal, according to Equation 36 below:

$$G28_b=(B19+B37)/2+(k27_b+k20_b+k29_b+k36_b)/4 \quad (36)$$

At step 112, if the selected photosite is a blue photosite, upper and lower vertical directional gradients, left and right horizontal directional gradients, and forward and backward diagonal directional gradients are similarly calculated for the selected blue photosite (steps 158 to 162) and an interpolated direction is selected. The interpolated green color at the selected blue photosite (steps 166 to 198) is then calculated in a manner very similar to that described above with the exception that the photosites used in the calculations are relative to the selected blue photosite.

The photosites used to calculate the various directional gradients for selected blue photosite B37 are illustrated in FIGS. 6A to 6F. In these figures, "G37" represents the missing green color to be interpolated at the selected blue photosite B37. The photosites used to calculate the missing green color G37 at the selected blue photosite B37 based on the determined interpolation direction are illustrated in FIGS. 7A to 7E.

Following step 132 or step 176, the next red or blue photosite is selected (step 134) and the process reverts back to step 112. The above steps are performed for each red and blue photosite resulting in an interpolated green color being generated for each red and blue photosite.

Figure 8:
FIG. 8 is a diagram of the Bayer color filter array illustrating interpolated green colors at red and blue photosites.
Figure 8:
Figure 8:
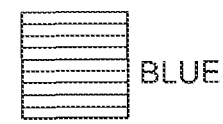

FIG. 8 is a diagram of the Bayer CFA 50 illustrating all interpolated green colors at red and blue photosites, each green color being calculated in the manner described above. At this point in the process, every photosite in the Bayer CFA 50 has either a sensed green color or an interpolated green color.

Figure 9:
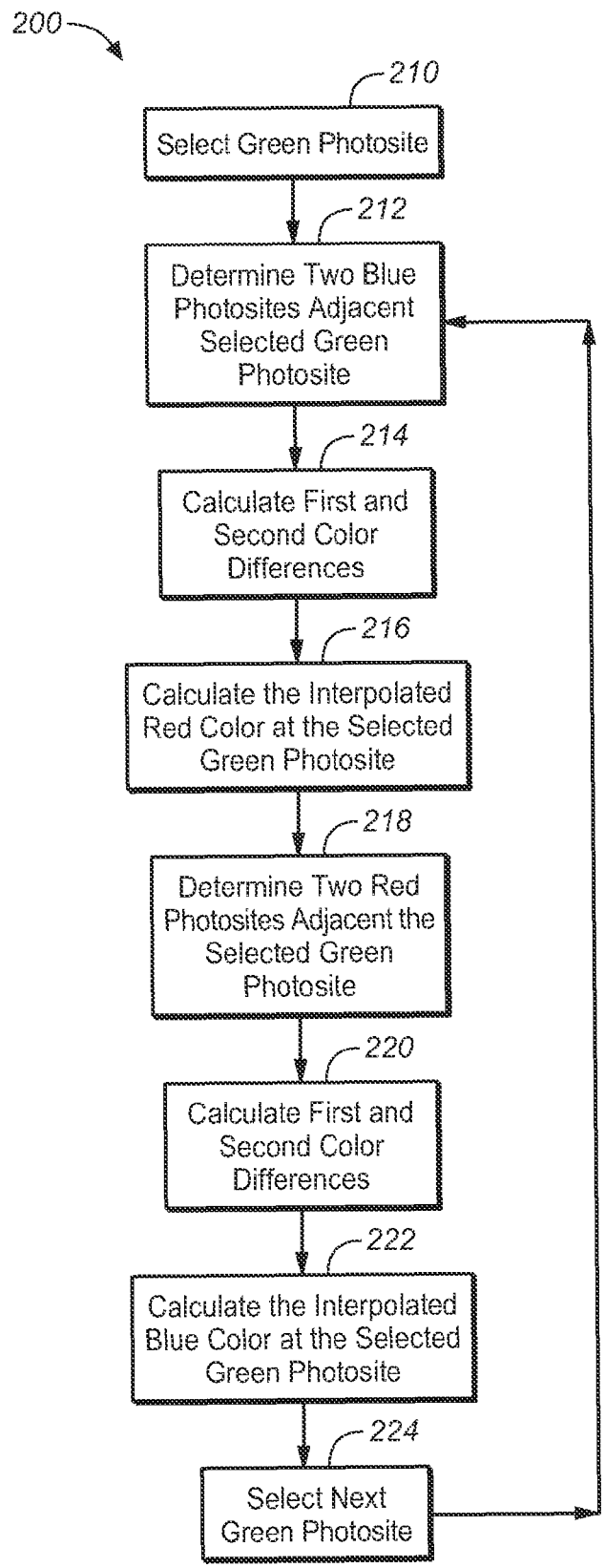
FIG. 9 is a flowchart illustrating steps for determining interpolated red colors and interpolated blue colors at green photosites of the Bayer color filter array.

With interpolated green colors at red and blue photosites calculated, red and blue colors at green photosites are interpolated (step 200) as shown in FIG. 9. During this process, a green photosite is initially selected (step 210). To determine the interpolated the red color at the selected green photosite, two blue photosites local to the selected green photosite are determined (step 212). First and second color differences for respective ones of the two local blue photosites are calculated based on their respective interpolated green colors and sensed blue colors (step 214). The interpolated red color at the selected green photosite is the difference between the sensed green color at the selected green photosite and an average of the first and second color differences (step 216).

To determine the interpolated blue color at the selected green photosite, two red photosites local to the selected green photosite are determined (step 218). First and second color differences for respective ones of the two local red photosites are calculated based on their respective interpolated green colors and sensed red colors (step 220). The interpolated blue color at the selected green photosite is the difference between the sensed green color at the selected green photosite and an average of the calculated first and second color differences (step 222). With the interpolated blue and interpolated red colors at the selected green photosite calculated, the next green photosite is selected (step 224) and the process reverts back to step 112. The above steps are performed for each green photosite resulting in interpolated red and blue colors being generated for each green photosite.

Figure 10A:
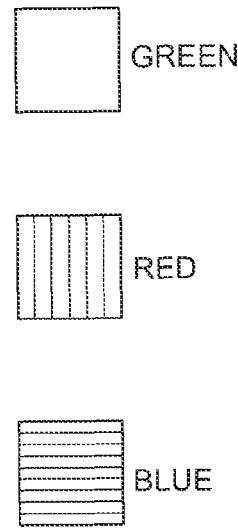
FIGS. 10A and 10B are diagrams illustrating the photosites used to determine an interpolated red color and an interpolated blue color at a selected green photosite of the Bayer color filter array.
Figure 10A:
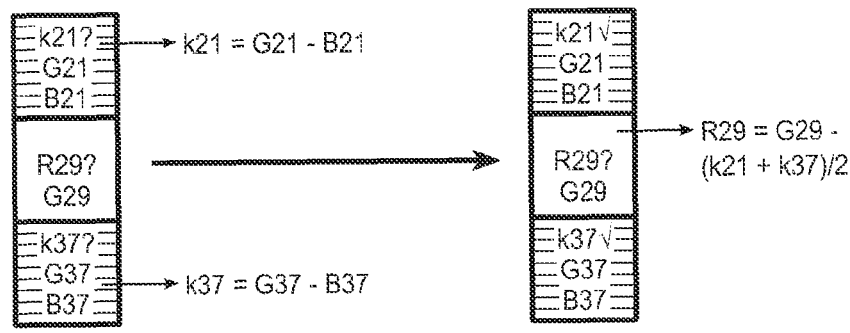

FIG. 10A illustrates the photosites used to calculate the interpolated red color R29 at selected green photosite G29. Blue photosites B21 and B37 local to the selected green photosite G29 are used. The first and second color differencing values k21 and k37 are calculated according to Equations 37 and 38 below:

$$k21 = G21 - B21 \quad (37)$$

$$k37 = G37 - B37 \quad (38)$$

The interpolated red color R29 at the selected green photosite G29 is then calculated according to Equation 39 below:

$$R29 = G29 - (k21 + k37)/2 \quad (39)$$

Figure 10B:
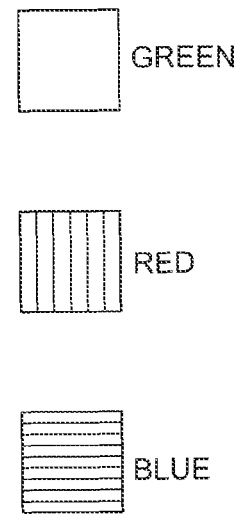
Figure 10B:
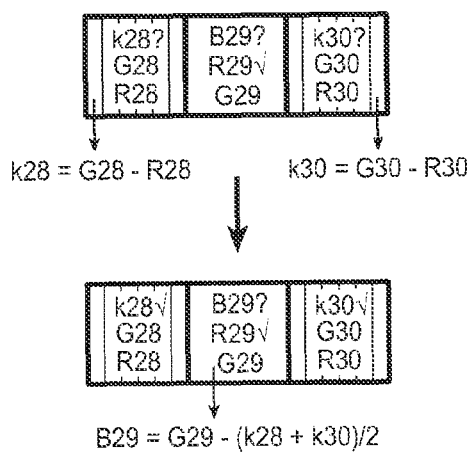

FIG. 10B illustrates the photosites used to calculate the interpolated blue color B29 at the selected green photosite G29. Red photosites R28 and R30 local to the selected green photosite G29 are used. The first and second color differences k28 and k30 are calculated according to Equations 40 and 41 below:

$$k28 = G28 - R28 \quad (40)$$

$$k30 = G30 - R30 \quad (41)$$

The interpolated blue color B29 at the selected green photosite G29 is then calculated according to Equation 42 below:

$$B29 = G29 - (k28 + k30)/2 \quad (42)$$

Figure 11:
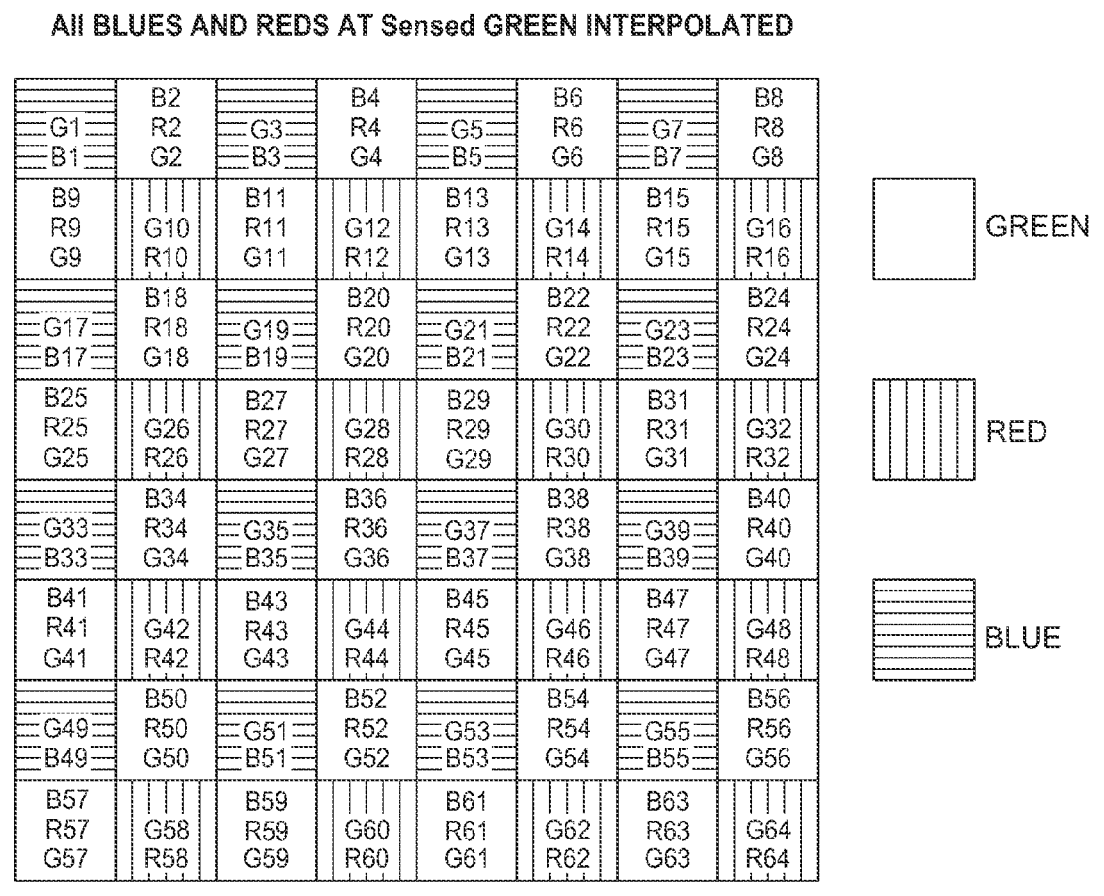

FIG. 11 is a diagram of the Bayer CFA 50 illustrating the interpolated green colors at red and blue photosites and the interpolated red and blue colors at green photosites. It will be appreciated that during the process described above for determining the interpolated red color and the interpolated blue color at each selected green photosite, interpolation is not calculated along a particular edge direction. However, as interpolated green colors are used in the calculations, which themselves have been determined using edge information, edge information is implicitly taken into account during these calculations.

With the interpolated green colors at red and blue photosites, and the interpolated red and blue colors at green photosites determined, interpolated red colors at blue photosites and interpolated blue colors at red photosites are calculated (step 300).

Figure 12A:
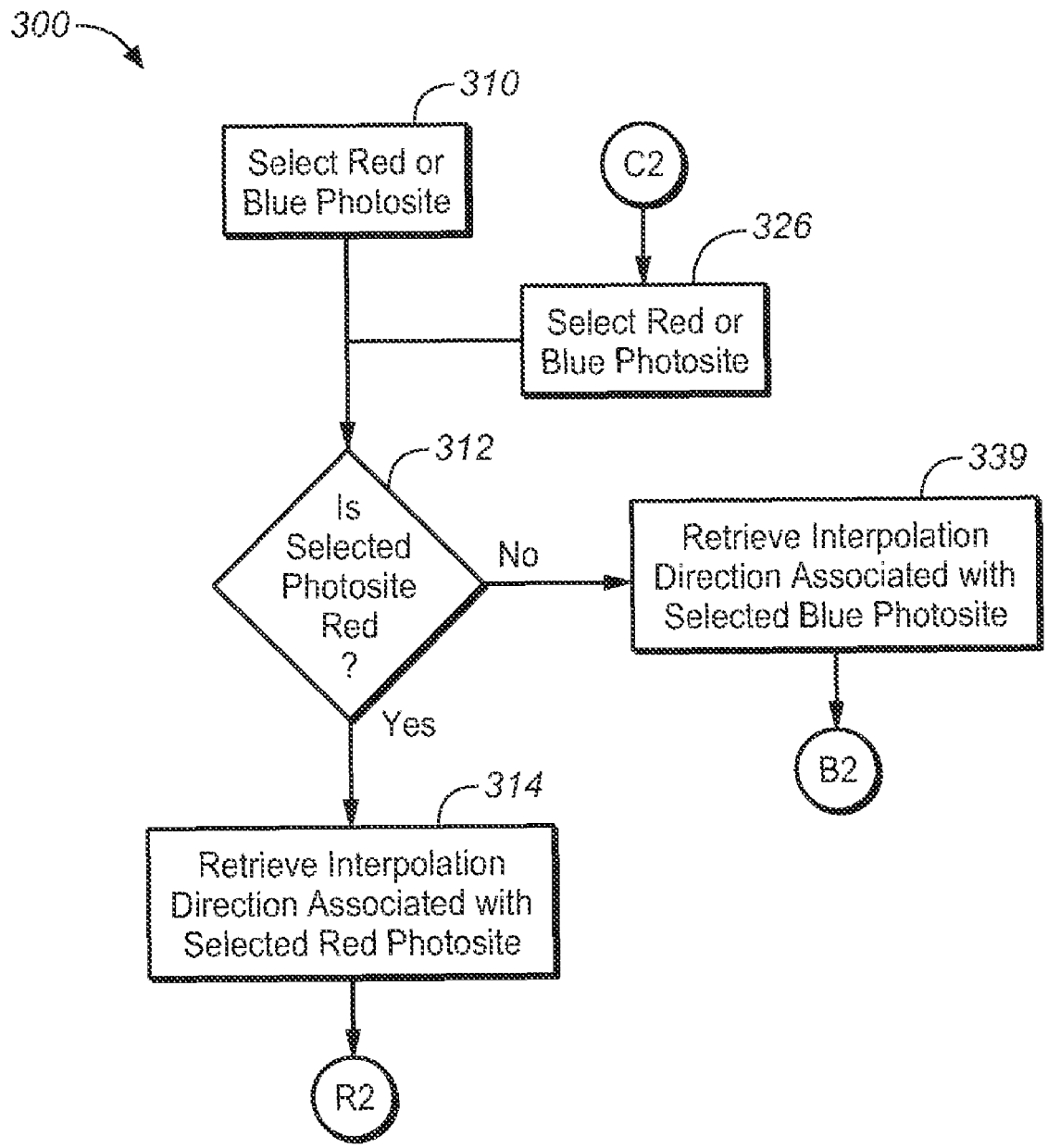
FIGS. 12A to 12C are flowcharts illustrating steps for determining interpolated red colors at blue photosites and interpolated blue colors at red photosites of the Bayer color filter array.
Figure 12B:
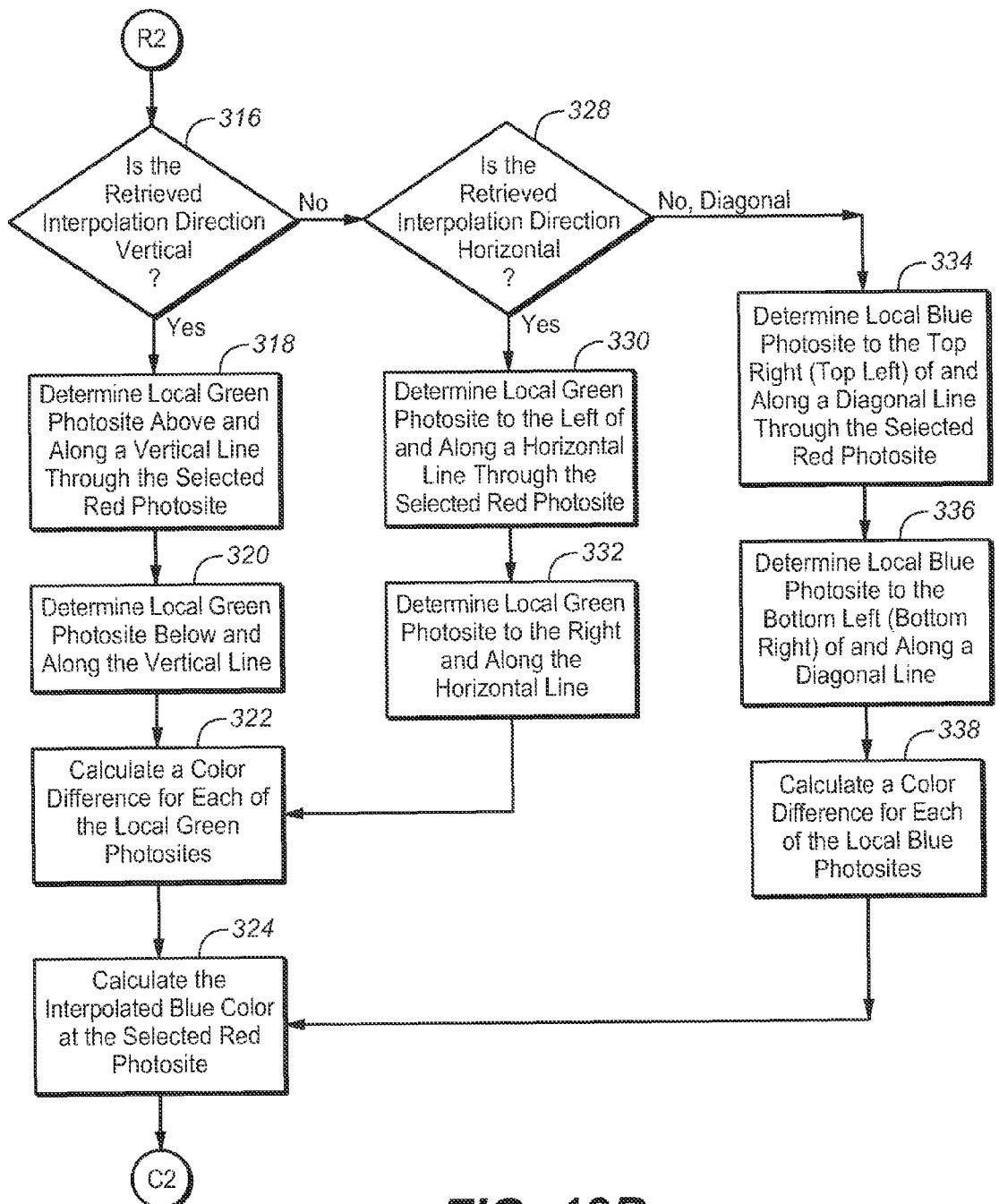
Figure 12C:
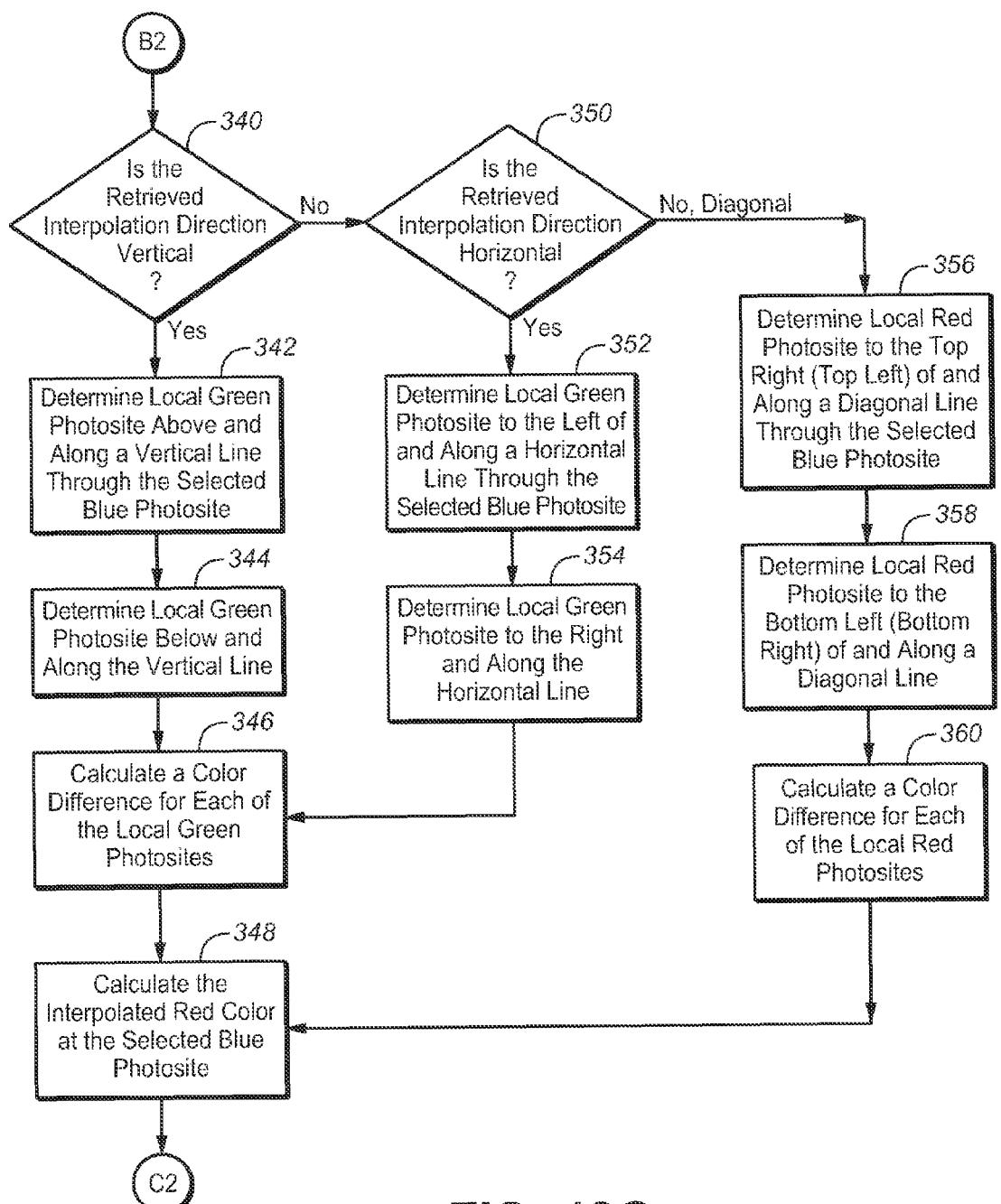

FIGS. 12A to 12C are flowcharts illustrating steps for determining interpolated red colors at blue photosites and interpolated blue colors at red photosites. During this process, a red or blue photosite is initially selected (step 310). If at step 312 a red photosite is determined to have been selected, then the interpolation direction stored previously in association with the selected red photosite (at step 120 of FIG. 3A) is retrieved (step 314). The retrieved interpolation direction, which represents the local edge direction, is used during interpolation of the missing blue color at the selected red photosite.

If the retrieved interpolation direction for the selected red photosite is vertical, then local green photosites along a vertical strand running through the selected red photosite both above and below the selected red photosite are determined (steps 318 and 320). First and second color differences are calculated as respective differences between the sensed green color and the interpolated blue color at each of the local green photosites (step 322). The interpolated blue color at the selected red photosite is the difference between the interpolated green color at the selected red photosite and the average of the first and second color differences (step 324).

If the retrieved interpolation direction for the selected red photosite is horizontal (step 328), then local green photosites along a horizontal strand running through the selected red photosite both to the left and to the right of the selected red photosite are determined (steps 330 and 332). First and second color differences are calculated and used to calculate the missing blue color at the selected red photosite in a manner similar to that described above with reference to steps 322 and 324.

If the retrieved interpolation direction is a forward diagonal, local blue photosites to the top right and bottom left of the selected red photosite (i.e., along a forward diagonal strand running through the selected red photosite) are determined (steps 334 and 336). First and second color differences are calculated as respective differences between the interpolated green color and the sensed blue color at the local blue photosites (step 338). The interpolated blue color at the selected red photosite is the difference between the interpolated green color at the selected red photosite and the average of the first and second color differences (step 324).

If the retrieved interpolation direction is a rearward diagonal, local blue photosites to the top left and bottom right of the selected red photosite are determined and first and second color differences are calculated in a manner similar to that described above. The interpolated blue color at the selected red photosite is then calculated.

Figure 14A:
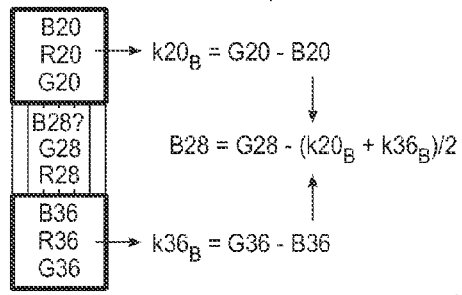

FIGS. 13 and 14A to 14D illustrate the photosites used to determine an interpolated blue color B28 at selected red photosite R28. Turning to FIG. 14A, for a vertical interpolation direction, the interpolated blue color B28 at selected red photosite R28 is calculated according to Equations 43 to 45 below:

$$k20_B = G20 - B20 \tag{43}$$

$$k36_B = G36 - B36 \tag{44}$$

$$B28 = G28 - (k20_B + k36_B)/2 \tag{45}$$

Figure 14B:
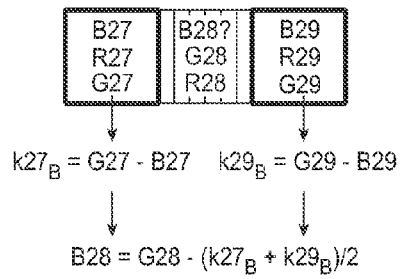

Turning to FIG. 14B, for a horizontal interpolation direction, the interpolated blue color B28 at the selected red photosite R28 is calculated according to Equations 46 to 48 below:

$$k27_B = G27 - B27 \tag{46}$$

$$k29_B = G29 - B29 \tag{47}$$

$$B28 = G28 - (k27_B + k29_B)/2 \tag{48}$$

Figure 14C:
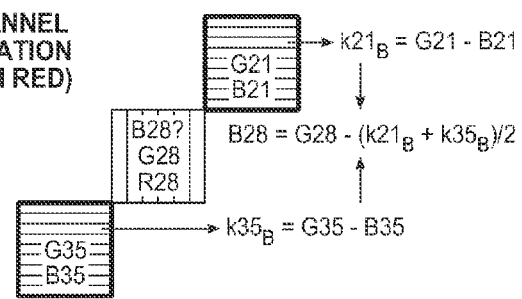

Turning to FIG. 14C, for a forward diagonal interpolation direction, the interpolated blue color B28 at the selected red photosite R28 is calculated according to Equations 49 to 51 below:

$$k21_B = G21 - B21 \tag{49}$$

$$k35_B = G35 - B35 \tag{50}$$

$$B28 = G28 - (k21_B + k35_B)/2 \tag{51}$$

Figure 14D:
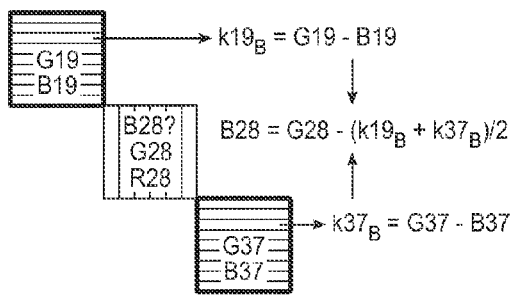
Figure 16A:
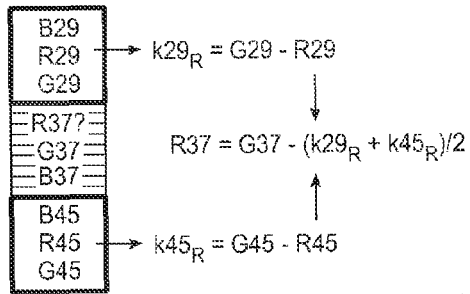
Figure 16B:
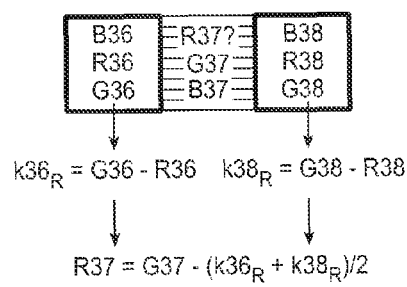
Figure 16C:
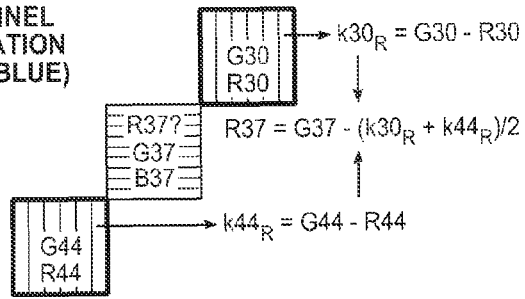
Figure 16D:
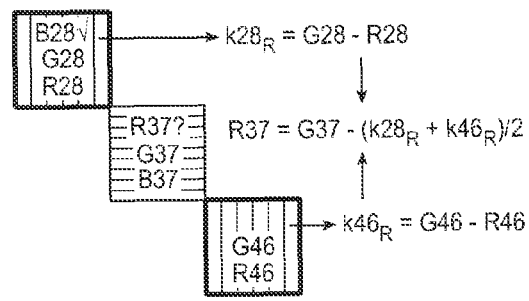

Turning to FIG. 14D, for a backward diagonal interpolation direction, the interpolated blue color B28 at the selected red photosite 28 is calculated according to Equations 52 to 54 below:

$$k19_B = G19 - B19 \tag{52}$$

$$k37_B = G37 - B37 \tag{53}$$

$$B28 = G28 - (k19_B + k37_B)/2 \tag{54}$$

Once the interpolated blue color B28 at the selected red photosite 28 has been determined as described above, the next red or blue photosite is selected (step 326) and the process reverts back to step 312.

If at step 312 the selected photosite is a blue photosite, then the interpolation direction stored previously in association with the selected photosite (at step 164 of FIG. 3A) is retrieved (step 339). The process of determining the interpolated red color at the selected blue photosite (steps 340 to 360) is the same as that described above for determining the interpolated blue color at the selected red photosite, with the exception that the photosites used in the calculations are relative to the selected blue photosite.

The photosites used to calculate the interpolated red color R37 at selected blue photosite B37 are illustrated in FIGS. 15 and 16A to 16D. In these figures, "R37" represents the missing red color to be interpolated at the selected blue photosite B37.

Figure 17:
FIG. 17 is a diagram illustrating a fully de-mosaiced Bayer color filter array.
Figure 17:
Figure 17:

FIG. 17 illustrates the fully de-mosaiced Bayer CFA 50. Each photosite comprises its sensed color and two interpolated missing colors.

Figure 18:
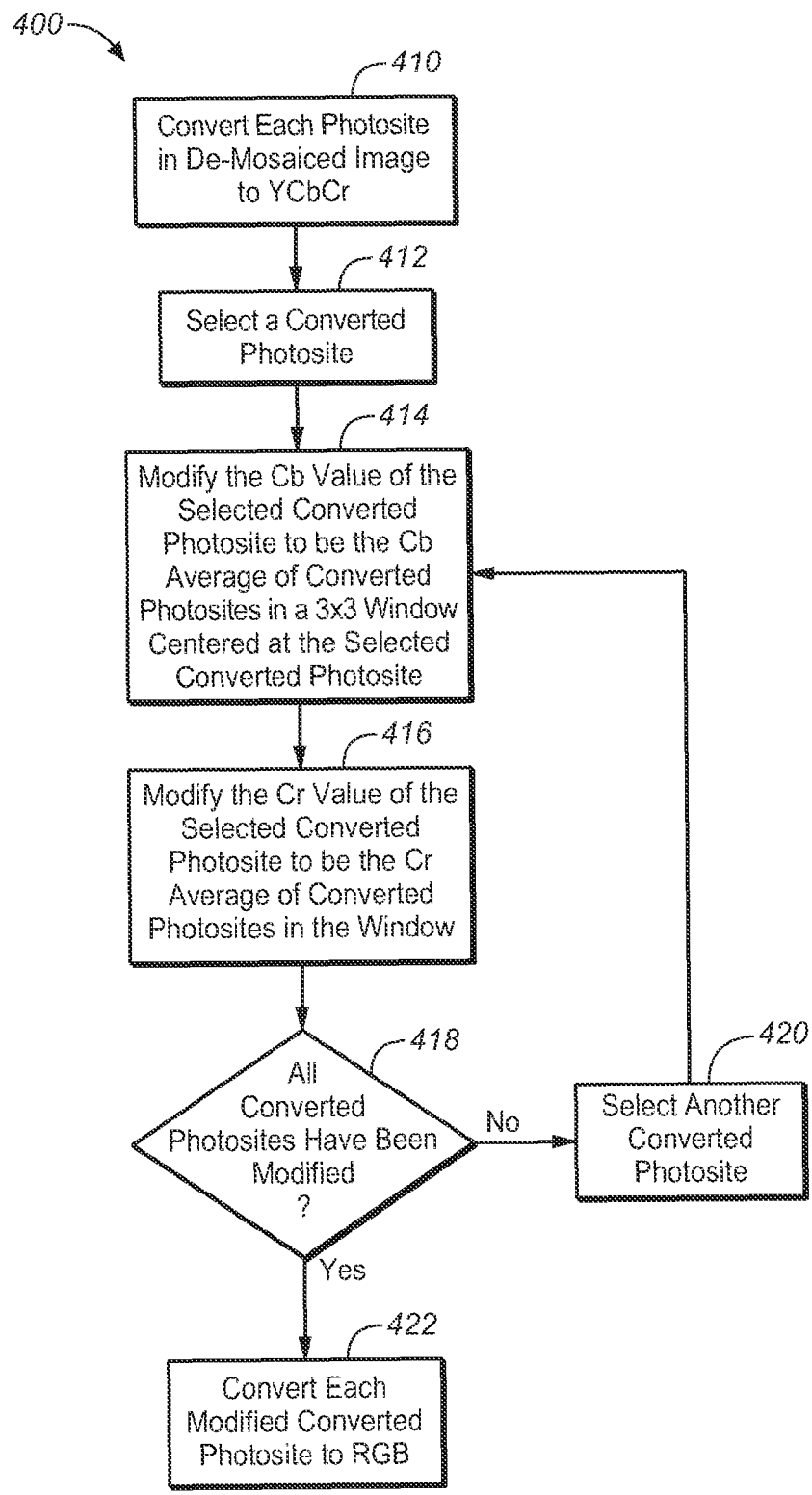
FIG. 18 is a flowchart illustrating steps for reducing Moiré in the fully de-mosaiced Bayer color filter array of FIG. 17.

FIG. 18 is a flowchart illustrating steps for removing Moiré from the fully de-mosaiced Bayer CFA of FIG. 17 (step 400). During this process, each photosite in the de-mosaiced Bayer CFA 50 is converted from RGB color space to YCbCr color space (step 410) in a well-known manner. A converted photosite is then selected (step 412) and the Cb value of the selected converted photosite is modified to be the Cb average of the converted photosites within a 3×3 window that is centered at the selected converted photosite (step 414). In a similar manner, the Cr value of the selected converted photosite is modified to be the Cr average of the converted photosites within a 3×3 window that is centered at the selected converted photosite (step 416). After all of the converted photosites have been modified as described above (step 418), then each modified converted photosite is converted from the YCbCr color space to RGB color space (step 422) for display.

Figure 19:
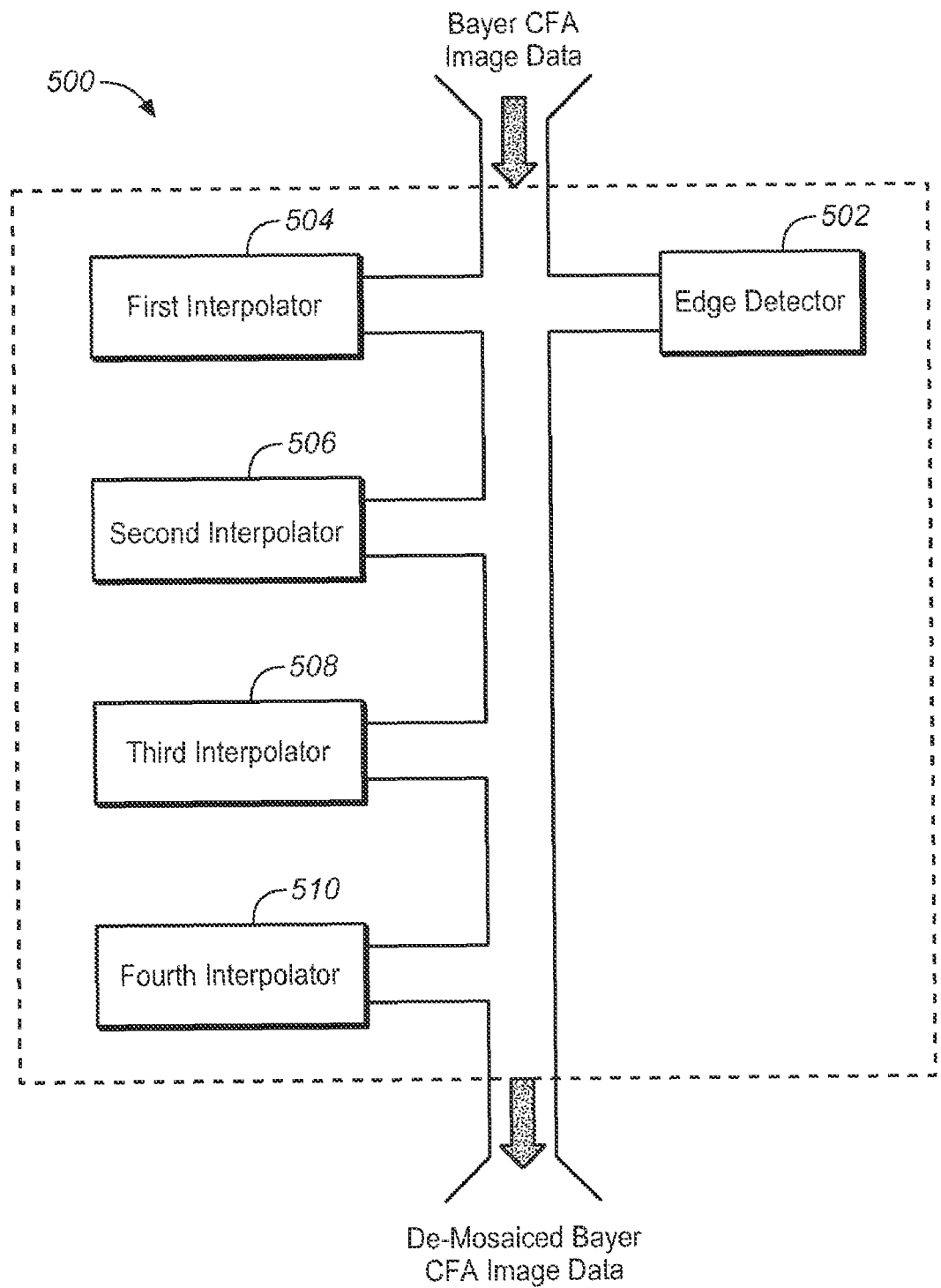
FIG. 19 is a block diagram of an apparatus for interpolating missing colors in a color filter array.

Turning to FIG. 19, a block diagram of an apparatus for interpolating missing colors in the Bayer CFA 50 is shown and is generally identified by reference numeral 500. As can be seen, the apparatus 500 comprises an edge detector 502 and multiple interpolators 504 to 510. The edge detector and interpolators receive image data from the Bayer CFA and process the image data according to the method described above. The edge detector 502 determines an edge direction for each of the red and blue photosites using sensed colors at local photosites. A first interpolator 504 determines an interpolated green color for each of the red and blue photosites. A second interpolator 506 determines interpolated red and blue colors for each green photosite. A third interpolator 508 determines an interpolated blue color for each red photosite. A fourth interpolator 510 determines an interpolated red color for each blue photosite. The edge detector 502 and interpolators 504 to 510 may be embodied by the processing unit of an image capture device such as a digital camera, video recorder, scanner, etc. In this case, the processing unit executes a software application that performs the edge detection and interpolation on the sensed image data. The software application may comprise program modules including routines, programs, object components, data structures etc. and may be embodied as computer readable program code stored on a computer readable medium. The computer readable medium is any data storage device that can store data, which can thereafter be read by the processing unit. Examples of computer readable media include for example read-only memory, random-access memory, CD-ROMs, magnetic tape and optical data storage devices.

In the embodiment described above, two vertical gradient calculations and two horizontal gradient calculations are carried out in order to provide more reliability for edge detection. However, an alternative method of providing edge detection reliability is to weight the photosites used for the gradient calculations based on distance from the selected photosite. In this manner, a significantly different color value farther away from the selected photosite will have less of an impact on the interpolation direction selection.

Although embodiments have been described, those of skill in the art will appreciate that variations and modifications may be made without departing from the spirit and scope of the invention defined by the appended claims.

What is claimed is:

1. A method of interpolating missing colors in a color filter array (CFA) comprising red, green and blue photosites, the method comprising:

using an edge detector and one or more interpolators to:
determine an interpolation direction for each red and each blue photosite based on local edge information;
interpolate a green color for each red and each blue photosite in the determined interpolation direction for the each red and each blue photosite;

for each green photosite, interpolate red and blue colors;

for each red photosite, interpolate a blue color in the determined interpolation direction for the each red photosite; and for each blue photosite, interpolate a red color in the determined interpolation direction for the each blue photosite; and then reduce Moiré by converting each photosite from RGB color space to YCbCr to produce converted photosites;

selecting each converted photosite, and for each selected converted photosite modifying a Cb value of the each selected converted photosite to a Cb average of converted photosites within a window that is centered at the each selected converted photosite; and wherein said green color interpolating in vertical and horizontal directions for each red photosite involves local green and red photosites; and for an upper vertical directional gradient, local green and red photosites in a first region that extends to the sides of and above the selected red photosite are used, a central strand of photosites of the first region comprises four photosites and extends vertically upwards beginning at the selected red photosite, and adjacent flanking strands of photosites comprise three photosites;

for a lower vertical directional gradient, local green and red photosites in a second region that extends to the sides of and below the selected red photosite are used, a central strand of photosites of the second region comprises four photosites and extends vertically downwards beginning at the selected red photosite, and adjacent flanking strands of photosites comprise three photosites;

for a left horizontal directional gradient, local green and red photosites in a third region that extends above and below and to the left of the selected red photosite are used, a central strand of photosites of the third region comprises four photosites and extends horizontally to the left beginning at the selected red photosite, and adjacent flanking strands of photosites comprise three photosites; and for a right horizontal directional gradient, local green and red photosites in a fourth region that extends above and below and to the right of the selected red photosite are used, a central strand of photosites of the fourth region comprises four photosites and extends horizontally to the right beginning at the selected red photosite, and adjacent flanking strands of photosites comprise three photosites.

2. The method of claim 1 wherein said interpolation direction for each red and each blue photosite corresponds to the direction along which a local edge, proximate to the each red and each blue photosite, most likely runs.

3. The method of claim 2, wherein said interpolation direction determining comprises:

for each red and blue photosite, examining different groups of photosites adjacent the photosite to detect local edges, each group of photosites being associated with a different direction;

determining the group of photosites associated with the direction that corresponds with the direction of the local edge; and assigning the photosite an interpolation direction corresponding to the direction associated with the determined group of photosites.

4. The method of claim 3 wherein during said photosite group examining, directional gradients for each group of photosites are calculated, and wherein during said photosite group determining, the directional gradients are compared to detect the smallest gradient.

5. The method of claim 4 wherein each group of photosites comprises photosites along a central strand intersecting the photosite and photosites along strands flanking the central strand.

6. The method of claim 4 wherein said directional gradients comprise vertical, horizontal and diagonal gradients.

7. The method of claim 6 wherein said directional gradients comprise upper and lower vertical, left and right horizontal and forward and backward diagonal gradients.

8. The method of claim 7 wherein said directional gradient calculating comprises, for each gradient, calculating differences between different pairs of photosites in each group.

9. The method of claim 8 wherein said green color interopolating in vertical and horizontal directions for each blue photosite involves local green and blue photosites.

10. The method of claim 9 wherein said green color interpolating in diagonal directions for each blue photosite involves local green and red photosites.

11. The method of claim 8 wherein said red and blue color interpolating for each green photosite, involves interpolated green colors at local photosites.

12. The method of claim 8 wherein said blue color interpolating for each red photosite involves the interpolated green color for the photosite and interpolated colors at local photosites.

13. The method of claim 8 wherein said red color interpolating for each blue photosite involves the interpolated green color for the photosite and interpolated colors at local photosites.

14. The method of claim 1 wherein said green color interpolating in diagonal directions for each red photosite involves local green and blue photosites.

15. A non-transitory computer readable medium embodying a computer program for interpolating missing colors in a color filter array comprising red, green and blue photosites, said computer program comprising:

computer program code for determining an interpolation direction for each red and each blue photosite based on local edge information;

computer program code for interpolating a green color for each red and each blue photosite in the determined interpolation direction for the each red and each blue photosite;

computer program code for interpolating, for each green photosite, red and blue colors;

computer program code for interpolating, for each red photosite, a blue color in the determined interpolation direction for the each red photosite; and computer program code for interpolating for each blue photosite, a red color in the determined interpolation direction for the each blue photosite;

and computer program code for then reducing Moiré by converting each photosite from RGB color space to YCbCr to produce converted photosites;

selecting each converted photosite, and for each selected converted photosite modifying a Cb value of the each selected converted photosite to a Cb average of converted photosites within a window that is centered at the each selected converted photosite; and wherein said green color interpolating in vertical and horizontal directions for each red photosite involves local green and red photosites; and for an upper vertical directional gradient, local green and red photosites in a first region that extends to the sides of and above the selected red photosite are used, a central strand of photosites of the first region comprises four photosites and extends vertically upwards beginning at the selected red photosite, and adjacent flanking strands of photosites comprise three photosites;

for a lower vertical directional gradient, local green and red photosites in a second region that extends to the sides of and below the selected red photosite are used, a central strand of photosites of the second region comprises four photosites and extends vertically downwards beginning at the selected red photosite, and adjacent flanking strands of photosites comprise three photosites;

for a left horizontal directional gradient, local green and red photosites in a third region that extends above and below and to the left of the selected red photosite are used, a central strand of photosites of the third region comprises four photosites and extends horizontally to the left beginning at the selected red photosite, and adjacent flanking strands of photosites comprise three photosites; and for a right horizontal directional gradient, local green and red photosites in a fourth region that extends above and below and to the right of the selected red photosite are used, a central strand of photosites of the fourth region comprises four photosites and extends horizontally to the right beginning at the selected red photosite, and adjacent flanking strands of photosites comprise three photosites.

* * * * *